US00RE45786E

(19) United States
(12) Reissued Patent
Ramaswamy et al.

(10) Patent Number: US RE45,786 E
(45) Date of Reissued Patent: Oct. 27, 2015

(54) METHODS AND APPARATUS TO MONITOR MEDIA EXPOSURE IN VEHICLES

(71) Applicant: The Nielsen Company (US), LLC, Schaumburg, IL (US)

(72) Inventors: Arun Ramaswamy, Tampa, FL (US); Fred Martensen, Tampa, FL (US); Robert A Luff, Wittman, MD (US); Kendall Shirilla, Tampa, FL (US)

(73) Assignee: THE NIELSEN COMPANY (US), LLC, New York, NY (US)

(21) Appl. No.: 14/260,890

(22) Filed: Apr. 24, 2014

Related U.S. Patent Documents

Reissue of:
(64) Patent No.: 8,549,552
Issued: Oct. 1, 2013
Appl. No.: 12/611,757
Filed: Nov. 3, 2009

(51) Int. Cl.
*H04N 7/16* (2011.01)
*H04R 29/00* (2006.01)

(52) U.S. Cl.
CPC ..... *H04R 29/00* (2013.01)

(58) Field of Classification Search
CPC ..... H04R 29/00
See application file for complete search history.

(56) References Cited

U.S. PATENT DOCUMENTS

| | | | |
|---|---|---|---|
| 4,698,781 | A | 10/1987 | Cockerell, Jr. |
| 4,703,444 | A | 10/1987 | Storms et al. |
| 4,718,106 | A | 1/1988 | Weinblatt |
| 4,722,054 | A | 1/1988 | Yorozu et al. |
| 4,751,512 | A | 6/1988 | Longaker |
| 4,812,980 | A | 3/1989 | Yamada et al. |
| 4,858,000 | A | 8/1989 | Lu |
| 4,905,080 | A | 2/1990 | Watanabe et al. |
| 4,930,011 | A | 5/1990 | Kiewit et al. |
| 4,967,209 | A | 10/1990 | Hasegawa et al. |
| 4,977,509 | A | 12/1990 | Pitchford et al. |
| 4,989,151 | A | 1/1991 | Nuimura |
| 4,994,974 | A | 2/1991 | Cummings |
| 5,019,828 | A | 5/1991 | Schoolman |
| 5,023,929 | A | 6/1991 | Call |
| 5,059,970 | A | 10/1991 | Raubenheimer et al. |

(Continued)

FOREIGN PATENT DOCUMENTS

| | | |
|---|---|---|
| AU | 2852197 | 1/1998 |
| EP | 0275328 | 7/1988 |
| EP | 0425347 | 5/1991 |
| EP | 0697773 | 2/1996 |
| EP | 0713335 | 5/1996 |

(Continued)

OTHER PUBLICATIONS

Li et al, The Research of Applying Wireless Sensor Networks to Intelligent Transportation System (ITS) Based on IEEE 802.15.14, 2006 IEEE.*

(Continued)

*Primary Examiner* — Jalatee Worjloh
(74) *Attorney, Agent, or Firm* — Hanley, Flight & Zimmerman, LLC

(57) ABSTRACT

Methods and apparatus to monitor media exposure in vehicles are disclosed. An example implementation includes collecting audience measurement data with a media monitoring device fixed in a vehicle and transmitting the audience measurement data from the media monitoring device to a shuttle located within the vehicle, the shuttle being incapable of collecting audience measurement data independent of the media monitoring device.

26 Claims, 12 Drawing Sheets

(56) References Cited

U.S. PATENT DOCUMENTS

| | | | | |
|---|---|---|---|---|
| 5,133,081 | A | 7/1992 | Mayo | |
| 5,142,278 | A | 8/1992 | Moallemi et al. | |
| 5,159,556 | A | 10/1992 | Schorter | |
| 5,214,757 | A | 5/1993 | Mauney et al. | |
| 5,245,694 | A * | 9/1993 | Zwern | 704/200 |
| 5,309,174 | A | 5/1994 | Minkus | |
| 5,359,529 | A | 10/1994 | Snider | |
| 5,373,315 | A | 12/1994 | Dufresne et al. | |
| 5,382,983 | A | 1/1995 | Kwoh et al. | |
| 5,389,934 | A | 2/1995 | Kass | |
| 5,394,333 | A | 2/1995 | Kao | |
| 5,412,416 | A | 5/1995 | Nemirofsky | |
| 5,412,573 | A | 5/1995 | Barnea et al. | |
| 5,444,769 | A | 8/1995 | Koen et al. | |
| 5,457,807 | A | 10/1995 | Weinblatt | |
| 5,465,115 | A | 11/1995 | Conrad et al. | |
| 5,481,294 | A | 1/1996 | Thomas et al. | |
| 5,483,276 | A | 1/1996 | Brooks et al. | |
| 5,510,828 | A | 4/1996 | Lutterbach et al. | |
| 5,528,248 | A | 6/1996 | Steiner et al. | |
| 5,579,124 | A | 11/1996 | Aijala et al. | |
| 5,581,800 | A | 12/1996 | Fardeau et al. | |
| 5,629,739 | A | 5/1997 | Dougherty | |
| 5,699,244 | A | 12/1997 | Clark, Jr. et al. | |
| 5,802,492 | A | 9/1998 | DeLorme et al. | |
| 5,812,069 | A | 9/1998 | Albrecht et al. | |
| 5,826,164 | A | 10/1998 | Weinblatt | |
| 5,848,129 | A | 12/1998 | Baker | |
| 5,850,249 | A | 12/1998 | Massetti et al. | |
| 5,872,588 | A | 2/1999 | Aras et al. | |
| 5,881,360 | A | 3/1999 | Fong | |
| 5,918,223 | A | 6/1999 | Blum et al. | |
| 5,923,252 | A | 7/1999 | Sizer et al. | |
| 5,953,055 | A | 9/1999 | Huang et al. | |
| 5,973,732 | A | 10/1999 | Guthrie et al. | |
| 5,983,069 | A | 11/1999 | Cho et al. | |
| 6,005,490 | A | 12/1999 | Higashihara | |
| 6,098,048 | A | 8/2000 | Dashefsky et al. | |
| 6,157,419 | A | 12/2000 | Mitsutake | |
| 6,252,522 | B1 | 6/2001 | Hampton et al. | |
| 6,295,092 | B1 | 9/2001 | Hullinger et al. | |
| 6,381,748 | B1 | 4/2002 | Lin et al. | |
| 6,405,370 | B1 | 6/2002 | Jarrell | |
| 6,466,971 | B1 | 10/2002 | Humpleman et al. | |
| 6,467,089 | B1 | 10/2002 | Aust et al. | |
| 6,480,783 | B1 | 11/2002 | Myr | |
| 6,530,082 | B1 | 3/2003 | Del Sesto et al. | |
| 6,546,419 | B1 | 4/2003 | Humpleman et al. | |
| 6,629,029 | B1 | 9/2003 | Giles | |
| 6,630,203 | B2 | 10/2003 | Bahn et al. | |
| 6,647,548 | B1 | 11/2003 | Lu et al. | |
| 6,697,104 | B1 | 2/2004 | Yakobi et al. | |
| 6,772,129 | B2 | 8/2004 | Alvarez et al. | |
| 6,853,904 | B2 | 2/2005 | Matsuo et al. | |
| 6,904,461 | B1 | 6/2005 | Randhava et al. | |
| 6,934,508 | B2 | 8/2005 | Ceresoli et al. | |
| 6,970,131 | B2 | 11/2005 | Percy et al. | |
| 7,038,619 | B2 | 5/2006 | Percy et al. | |
| 7,155,336 | B2 | 12/2006 | Dorfman et al. | |
| 7,176,834 | B2 | 2/2007 | Percy et al. | |
| 7,209,831 | B2 | 4/2007 | Hilliard et al. | |
| 7,215,280 | B1 | 5/2007 | Percy et al. | |
| 7,222,071 | B2 | 5/2007 | Neuhauser et al. | |
| 7,359,687 | B2 | 4/2008 | Ceresoli et al. | 455/152.1 |
| 7,962,315 | B2 * | 6/2011 | Jensen et al. | 702/187 |
| 8,245,249 | B2 * | 8/2012 | Lee | 725/19 |
| 8,549,552 | B2 | 10/2013 | Ramaswamy et al. | |
| 2001/0007149 | A1 | 7/2001 | Smith | |
| 2001/0049620 | A1 | 12/2001 | Blasko | |
| 2002/0010919 | A1 * | 1/2002 | Lu et al. | 725/18 |
| 2002/0015574 | A1 | 2/2002 | Suito et al. | |
| 2002/0056089 | A1 | 5/2002 | Houston | |
| 2002/0097193 | A1 | 7/2002 | Powers | |
| 2002/0102908 | A1 * | 8/2002 | Chan | 446/269 |
| 2002/0129360 | A1 | 9/2002 | Lee | |
| 2002/0133412 | A1 | 9/2002 | Oliver et al. | |
| 2002/0198762 | A1 | 12/2002 | Donato | |
| 2003/0005433 | A1 | 1/2003 | Janik et al. | |
| 2003/0018977 | A1 | 1/2003 | McKenna | |
| 2003/0041141 | A1 | 2/2003 | Abdelaziz et al. | |
| 2003/0045955 | A1 * | 3/2003 | Janik | 700/94 |
| 2003/0122708 | A1 | 7/2003 | Percy et al. | |
| 2003/0131350 | A1 | 7/2003 | Peiffer et al. | |
| 2003/0133412 | A1 | 7/2003 | Iyer et al. | |
| 2003/0177488 | A1 | 9/2003 | Smith et al. | |
| 2004/0012272 | A1 | 1/2004 | Houle et al. | |
| 2004/0027271 | A1 * | 2/2004 | Schuster et al. | 342/42 |
| 2004/0080452 | A1 | 4/2004 | Percy et al. | |
| 2004/0110515 | A1 | 6/2004 | Blumberg et al. | |
| 2004/0133480 | A1 | 7/2004 | Domes | |
| 2005/0035857 | A1 | 2/2005 | Zhang et al. | |
| 2005/0144632 | A1 | 6/2005 | Mears et al. | |
| 2005/0149398 | A1 | 7/2005 | McKay | |
| 2005/0243784 | A1 | 11/2005 | Fitzgerald et al. | 370/338 |
| 2006/0053110 | A1 | 3/2006 | McDonald et al. | |
| 2006/0208946 | A1 | 9/2006 | Bailey et al. | |
| 2007/0011040 | A1 | 1/2007 | Wright et al. | |
| 2007/0242839 | A1 * | 10/2007 | Kim et al. | 381/122 |
| 2007/0249216 | A1 * | 10/2007 | Cheng | 439/490 |
| 2007/0257816 | A1 | 11/2007 | Lyle et al. | |
| 2008/0012406 | A1 * | 1/2008 | Piwko et al. | 297/217.3 |
| 2008/0140479 | A1 | 6/2008 | Mello et al. | |
| 2009/0076637 | A1 * | 3/2009 | Kameyama | 700/94 |
| 2009/0077578 | A1 * | 3/2009 | Steuer et al. | 725/18 |
| 2009/0089065 | A1 * | 4/2009 | Buck et al. | 704/275 |
| 2009/0132072 | A1 * | 5/2009 | Angus | 700/94 |
| 2009/0180638 | A1 * | 7/2009 | Hsu et al. | 381/74 |
| 2010/0074239 | A1 * | 3/2010 | Born | 370/338 |
| 2010/0312369 | A1 * | 12/2010 | Dollar, Jr. | 700/94 |
| 2011/0103595 | A1 | 5/2011 | Ramaswamy et al. | |

FOREIGN PATENT DOCUMENTS

| | | |
|---|---|---|
| EP | 1 213 860 | 6/2002 |
| EP | 0 813 716 | 5/2003 |
| WO | 98/10539 | 3/1998 |
| WO | 03095945 | 11/2003 |
| WO | WO03095945 | 11/2003 |
| WO | 2005019853 | 3/2005 |
| WO | WO2005019853 | 3/2005 |
| WO | 2006015188 | 2/2006 |
| WO | 2006015339 | 2/2006 |
| WO | WO2006015339 | 2/2006 |
| WO | 2006058274 | 6/2006 |
| WO | WO2006058274 | 6/2006 |
| WO | WO2006015188 | 6/2008 |

OTHER PUBLICATIONS

United States Patent and Trademark Office, "Non-Final Office Action", issued in connection with U.S. Appl. No. 12/611,757, dated Feb. 10, 2012 (26 pages).

United States Patent and Trademark Office, "Final Office Action", issued in connection with U.S. Appl. No. 12/611,757, dated Sep. 26, 2012 (18 pages).

United States Patent and Trademark Office, Notice of Allowance, issued in connection with U.S. Appl. No. 12/611,757, dated May 30, 2013 (11 pages).

United States Patent and Trademark Office, Notice of Allowance, issued in connection with U.S. Appl. No. 12/611,757, dated Aug. 15, 2013 (4 pages).

Clark, Julie. "Shopping with Detectives: Customer Tracking Takes the Mystery out of Store Design (The Digital Store)," Display and Design Ideas, May 2002 (v14, n5, p. 48, 2 pages).

Robinson, Phillip, Global positioning helps keeps travelers on course, Knight Ridder/Tribune News Service, Jun. 1997, 3 pages.

Roy Want, Kenneth P. Fishkin, Anuj Gujar, Beverly L. Harrison, "Bridging Physical and Virtual Worlds with Electronic Tags," ACM CHI '99, Pittsburgh, PA, May 15-20, 1999. ACM Press. Retrieved from http://citeseer.ist.psu.edu/352441.html.

* cited by examiner

METHODS AND APPARATUS TO MONITOR MEDIA EXPOSURE IN VEHICLES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present disclosure pertains to media monitoring and, more specifically to, methods and apparatus to monitor media exposure in vehicles.

BACKGROUND

Determining size, demographics, and media exposure and/or consumption patterns of a media audience helps media providers to understand their audience and better tailor their media content. Further, accurate media exposure demographics allow advertisers to target media content to audiences of a desired size and/or audiences comprising members having a set of common desired characteristics (e.g., income level, lifestyles, interests, etc.) associated with typical buyers of the advertised product or service.

In order to collect demographics of audiences, an audience measurement company may enlist a number of media utilizing households and/or consumers (e.g., panelists) to cooperate in an audience measurement study for a period of time. The media usage habits of these panelists, as well as demographic data about these panelists, are collected using automated and/or manual collection methods. The collected data is subsequently used to generate informational statistics related to media exposure, including, for example, audience sizes, audience demographics, audience preferences, the total number of hours of media exposed per audience member and/or per region, program ratings, etc.

Traditional audience measurement systems have employed a client/server architecture wherein the client (e.g., a metering device) and server (e.g., a data collection unit to collect data from the metering device) are in different physical locations. For example, in a typical system, the client is located near an audience member being monitored (e.g., attached to or otherwise in proximity to a television, included in a portable device carried by the audience member, etc.). The server is typically located at an off-site location that is away from the client (e.g., a central office of an audience measurement company such as the Nielsen Company, etc.) The client typically collects audience measurement data and transmits the same to the server. The server then analyzes audience measurement data from a number of panelists to identify ratings, trends, etc.

DETAILED DESCRIPTION

Figure 1:
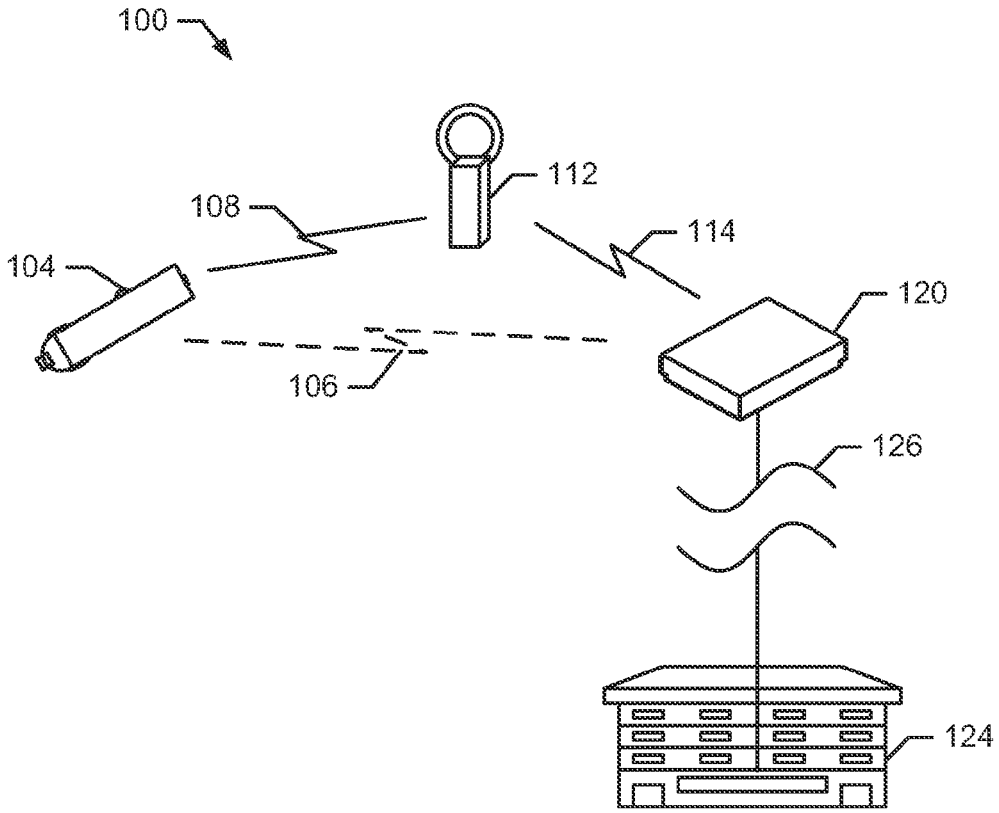
FIG. 1 is a block diagram of an example system to monitor media exposure in vehicles.

Media monitoring systems may be implemented in different configurations based on their intended use. For example, vehicles typically include a media receiver capable of tuning a plurality of inputs (e.g., AM Radio, FM Radio, satellite radio, CD player, MP3 player, DVD player, etc.) via wired and/or wireless connections. As described herein, an example media monitoring device communicates with the media receiver to extract or generate information about media content presented by the media receiver. The media monitoring device may be implemented by any combination of hardware, firmware, and/or software. Such hardware, firmware, and/or software may be adapted to perform a number of monitoring tasks including, by way of example, not limitation, detecting a channel tuning status of a tuner disposed in the media receiver, extracting program identification codes embedded in or otherwise associated with signals tuned by the media receiver, generating signatures characteristic of signals tuned by the media receiver, etc. Alternatively, the media monitoring device may not communicate with the media receiver of the vehicle. In such an implementation, the media monitoring device wirelessly monitors media presented to the audience by the media receiver (e.g., by collecting free field audio). In the illustrated example, collected media exposure data is transported out of the vehicle via an audience measurement data shuttle and is then transmitted to a data collection facility for processing. If an audience measurement data shuttle is assigned to each individual panelist, the audience measurement data shuttle may add a unique identifier to the data to thereby associate demographic data with the collected audience measurement data.

In the field of media monitoring, media companies seek high accuracy media exposure data. To achieve such accuracy, it is desirable to reduce the level of involvement of the panelists. The more panelists are asked to do, the more likely the panelists will forget or intentionally fail to perform a requested task. The degree to which the panelists perform requested tasks (e.g., carrying a meter, logging into a meter, etc.) is referred to as the degree of compliance of the panelist.

Media monitoring systems are designed to result in high levels of audience member compliance, resulting in data that more accurately reflects the actual exposure of panelists to media content. Media monitoring in vehicles presents challenges that are different in degree or type from the challenges faced by in home media monitoring. If panelists are required to take more extensive action to enable in-vehicle data collection than to enable in-home data collection, the in vehicle collection system may exhibit lower levels of audience member compliance than are experienced in home media monitoring systems due to the constraints of the in vehicle environment, the amount of time audience members spend in vehicles, and/or the occurrence of frequently entering/exiting of the vehicle (e.g., short trips). Additionally, the physical aspects of vehicles present constraints on the in-vehicle monitoring. Such constraints include limited physical space, limited selection of power sources, and limited methods of transmitting collected monitoring data.

In examples disclosed herein, an example media monitoring device is placed in a vehicle to monitor media exposure and an audience measurement data shuttle is used to transport and/or transmit stored audience measurement data to a central location. To increase the probability of audience member compliance, example implementations of the media monitoring device use automated methods to collect and wirelessly transmit audience measurement data. In some implementations, audience measurement data is transmitted to an intermediate collection site or audience measurement data aggregator in, for example, the audience member's residence to aggregate audience measurement data before being sent to a processing location (e.g., an audience measurement data collection server, a central facility, etc.) A direct communication link between the in-vehicle media monitoring device and a collection site is typically not available. Accordingly, example media monitoring systems as disclosed herein include an intermediary audience measurement data shuttle to wirelessly receive audience measurement data from the in-vehicle media monitoring device and to wirelessly transmit that data to the audience measurement data aggregator when the audience measurement data shuttle is removed from the vehicle and brought into communication range of the audience measurement data aggregator. For example, the intermediate audience measurement data shuttle may be implemented as a key chain or other small device to be carried by the panelist. In this way, the panelist will naturally carry the audience measurement data shuttle into proximity of the audience measurement data aggregator when the panelist returns home. Because the audience measurement data shuttle is implemented as a device that the panelist will naturally carry in and out of the house (e.g., a car key chain), the panelist is not required to take any extraordinary measures to facilitate in-vehicle data collection and panelist compliance is improved.

FIG. 1 is a block diagram of an example system 100 for in-vehicle audience measurement. The example audience measurement system 100 of FIG. 1 is adapted to monitor media exposure in a vehicle. The example system 100 includes a media monitoring device 104 fixed in the vehicle; an audience measurement data shuttle 112; an audience measurement data aggregator 120; and an audience measurement data collection server 124. The audience measurement data aggregator 120 of the illustrated example is located in the home of the panelist. The audience measurement data collection server 124 communicates with the audience measurement data aggregator 120 via a communication link 126 such as, for example, the interne, the plain old telephone system (POTS), etc. The media monitoring device 104, the audience measurement data shuttle 112, and the audience measurement data aggregator 120 of the illustrated example communicate via the communication links 106, 108, and 114.

The example media monitoring device 104 of the illustrated example is fixed in the vehicle. The media monitoring device 104 may have any structure and/or form factor that enables the device to be permanently or semi-permanently installed in the vehicle. In the illustrated example, the media monitoring device 104 is configured to be engaged within a power socket of the vehicle (e.g., a 12 volt power socket such as a cigarette lighter socket or other multi-purpose electrical socket.) However, the media monitoring device 104 may be fixed in a vehicle by any other means. For example, the media monitoring device 104 may be mounted on a windshield, secured to a dashboard, placed in a glove box or vehicle console, attached to a visor, mounted inside a vehicle, mounted outside a vehicle, etc. Further, where the media monitoring device is engaged within a vehicle power socket, the socket may be of any voltage, current, or configuration. For example, the power socket may be a 115-120 volt outlet. In alternative examples, the in-vehicle media monitoring device 104 may be integrated into a GPS receiver, an MP3 player, a portable (e.g., cellular) telephone and/or a garage door opener.

The example media monitoring device 104 of FIG. 1 monitors media exposure within the vehicle, and captures audience measurement data reflecting that exposure. The captured audience measurement data is stored within a memory of the media monitoring device 104 until it is wirelessly transferred to one or more audience measurement data shuttles 112 and/or directly to the audience measurement data aggregator 120.

In operation, the media monitoring device 104 may enter a wireless transmission range of the audience measurement data aggregator 120 (e.g., when the vehicle is parked in a garage associated with the house) and transmit the collected audience measurement data to the audience measurement data aggregator 120, via wireless transmission 106. In some cases, the media monitoring device 104 may not come within the wireless transmission range of the audience measurement data aggregator 120. In other cases, the media monitoring device 104 may enter the wireless transmission range of the audience measurement data aggregator 120 on a limited basis or infrequently. For example, an audience member may park their vehicle at a distance which exceeds the wireless transmission range of the audience measurement data aggregator 120 and/or the in-vehicle media monitoring device 104. If the wireless transmission 106 is only performed on a limited basis (e.g. once a week, once a month, etc.), the memory of the media monitoring device 104 may become full, resulting in loss of audience measurement data, and/or data may not be received for analysis in a timely manner.

To address this issue, in the illustrated example, one or more audience measurement data shuttle(s) 112 are used to transport audience measurement data from the media monitoring device 104 into a wireless transmission range of the audience measurement data aggregator 120. In the illustrated example, the audience measurement data shuttle 112 is a key fob, which may be carried by an audience member along with their keys (e.g., on an audience member's keychain). When the audience measurement data shuttle 112 is within wireless transmission range of the media monitoring device 104, the media monitoring device 104 wirelessly transmits the audience measurement data to the audience measurement data shuttle 112 via wireless transmission 108.

The audience measurement data shuttle 112 may be provided to each panelist in a given household (e.g., father, mother, son, daughter, etc.) As a result, each audience measurement data shuttle 112 within the vehicle may collect wirelessly transmitted audience measurement data from the same media monitoring device 104. Each audience measurement data shuttle is preferably provided with a unique identifier that is appended or otherwise associated with the audience measurement data that the audience measurement data shuttle receives (e.g., the audience measurement data shuttle includes functionality to add the identifier to the data it receives and/or transmits). The unique identifiers are associated with the individuals that carry the audience measurement data shuttles 112 in, for example, a database at the audience measurement data collection server 124. As a result, when received at the audience measurement data collection server 124, the audience measurement company may associate demographic data (e.g., white male, age 43, income $50,000 per annum, etc) with the received audience measurement data. To ensure correct data is stored in each audience measurement data shuttle 112, the fixed, in-vehicle media monitoring device 104 transmits the collected data substantially continuously (e.g., when the vehicle is powered on), at predetermined intervals, or whenever an event associated with a passenger change occurs (e.g., when the car is placed in park, when the tuned channel of the radio or the source of the media is changed, when the car is turned off, when the car is turned on, etc.)

The audience measurement data shuttle(s) 112 are likely to enter the wireless transmission range of the audience measurement data aggregator 120 at a greater frequency than the media monitoring device 104 (e.g., once a day, twice a day, etc.) because the audience member(s) will carry their respective audience measurement data shuttles 112 with them as they enter buildings (e.g., the panelist's home or other locations) that may be equipped with an audience measurement data aggregator 120. Advantageously, little or no out of the ordinary panelist involvement is required to collect and return the audience measurement data to the audience measurement data collection server 124. Audience member compliance is thereby improved, allowing more accurate data to be collected.

To achieve enhanced granularity of demographic data, even when the media monitoring device 104 is within the wireless transmission range of the audience measurement data aggregator 120, the media monitoring device 104 may still be configured to transmit audience measurement data only to the audience measurement data shuttle(s) 112, rather than directly to the audience measurement data aggregator. In other implementations, the media monitoring device 104 may be configured to transmit data to the audience measurement data shuttle(s) 112 when the audience measurement data shuttle(s) 112 are present and to transmit data to the audience measurement data aggregator 120 only when no audience measurement data shuttle 112 is present. This latter approach (i.e., always transmitting data via the shuttle(s)) may prevent data loss due to transmission being interrupted when the vehicle is moved out of the wireless transmission range of audience measurement data aggregator 120. For example, when the audience measurement data shuttle 112 is carried on an audience member's keychain, the audience measurement data shuttle 112 will remain in the wireless transmission range of the audience measurement data aggregator 120 even when the vehicle is driven away from the audience measurement data aggregator 120 in the panelist's home as long as the panelist with the audience measurement data shuttle 112 remains at home.

When an audience measurement data shuttle 112 is within the wireless transmission range of the audience measurement data aggregator 120, the audience measurement data shuttle 112 wirelessly transmits the audience measurement data stored therein to the audience measurement data aggregator 120 via wireless transmission 114. As discussed above, there may be multiple audience measurement data shuttles 112 which may communicate with the media monitoring device 104 and the audience measurement data aggregator 120. For example, a group of audience members may travel in the same vehicle and each audience member may have their own audience measurement data shuttle 112, which collects audience measurement data for media presented near the audience member via the media monitoring device 104. Advantageously, each of the audience measurement data shuttles 112 can transmit audience measurement data to the data collection server 124 so that media consumption specific to each audience member can be collected. For example, each audience measurement data shuttle 112 may be associated with the demographics of an audience member that is carrying the shuttle and the media content exposure can be credited based on those demographics.

Additionally or alternatively, panelists may travel in different vehicles (e.g., a household with two or more vehicles). In such examples, an in-vehicle media monitoring device 104 is installed in each vehicle. Preferably, the data collected by each in-vehicle media monitoring device 104 is stamped or otherwise associated with a unique identifier associated with the in-vehicle media monitoring device 104 that collected the audience measurement data. In this way (i.e., by addressing a database associating the unique identifier of the in-vehicle media monitoring device 104 with the vehicle in which it is installed), the audience measurement data can be associated with the vehicle in which the audience measurement data was collected. As a result, the shuttles of panelists can be used to collect data in any vehicle associated with the monitored household as well as in any vehicle associated with another monitored household that carries an in-vehicle media monitoring device 104.

The audience measurement data aggregator 120 of the illustrated example is located in a building such as the panelist's home. The location of the audience measurement data aggregator 120 may be advantageously selected so as to increase the availability of a wireless transmission area of the audience measurement data aggregator 120 and to increase the likelihood that the audience measurement data shuttle 112 will enter the wireless transmission area. Alternatively, the building may be any type of building. For example, the building may be a public building such as a grocery store, a library, a parking garage, a department store, a convenience store, etc. Alternatively, the audience measurement data aggregator 120 may not be located inside the building, and may be placed on the exterior of the building or away from the building. For example, the audience measurement data aggregator 120 may be placed in a parking lot, a park, along a street, along a highway, etc.

Periodically and/or a-periodically (e.g., upon expiration of a timer, when a threshold of collected audience measurement data is reached, etc.) the aggregator 120 transmits the audience measurement data to the audience measurement data collection server 124 via the communication medium 126. Any method of determining when to transmit audience measurement data may be used. For example, the audience measurement data aggregator 120 may store audience measurement data up to a specified amount (e.g., 1 kB, 64 kB, 1 MB) before transmitting the audience measurement data, the audience measurement data aggregator 120 may transmit audience measurement data at a fixed interval (e.g., 30 minutes, 3 hours, 1 day, 1 week, etc.), and/or the audience measurement data aggregator 120 may transmit audience measurement data in response to an external event (e.g., user pushes a synchronize button, audience measurement data collection server 124 requests updated audience measurement data, audience measurement data shuttle 112 comes within the wireless transmission range of the audience measurement data aggregator 120, etc.). The transmission medium 126 could be implemented by any transmission medium such as, for example, a Digital Subscriber Line (DSL), Satellite, T1, Cellular radio, Ethernet, Wi-Fi, or any collection of transmission media.

As described above, the example system 100 facilitates transmission of audience measurement data from the in-vehicle media monitoring device 104 to the audience measurement data collection server 124 via the audience measurement data shuttle(s) 112 and the audience measurement data aggregator 120. The system 100 may also facilitate bidirectional data transmission from, for example, the audience measurement data collection server 124 to the in-vehicle media monitoring device 104 via the audience measurement data aggregator 120 and/or the audience measurement data shuttle(s) 112. The data transmitted by the audience measurement data collection server 124 may be software and/or firmware for devices such as, for example, the media monitoring device 104, the audience measurement data shuttle 112, or the audience measurement data aggregator 120. Additionally or alternatively, the data may be reference signatures, reference watermarks, reference codes, or any other data to facilitate the identification of media and/or, more generally, collection of audience measurement data. Further, the media monitoring device 104 may have the facility to transmit audience measurement data directly to the audience measurement data collection server 124. For example, the media monitoring device 104 may contain a cellular modem which would allow audience measurement data to be transmitted via a cellular network.

Figure 2:
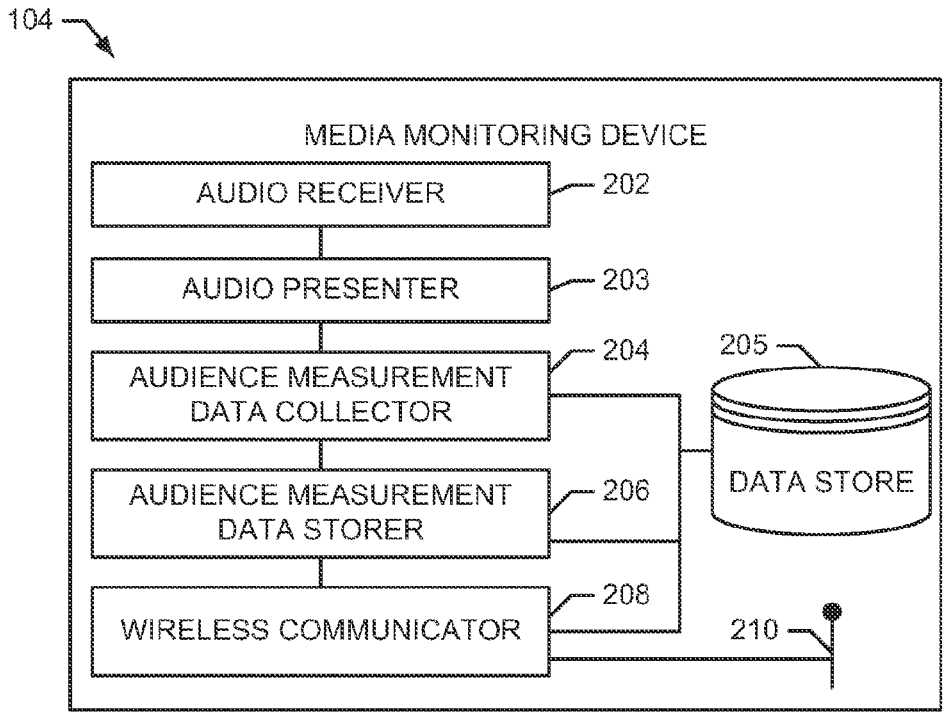
FIG. 2 is a block diagram of the example media monitoring device of FIG. 1.

FIG. 2 is a block diagram of the example in-vehicle media monitoring device 104 of FIG. 1. The example media monitoring device 104 includes an audio receiver 202, an audio presenter 203, an audience measurement data collector 204, a data store 205, an audience measurement data storer 206, a wireless communicator 208, and an antenna 210.

In the illustrated example, the audio receiver 202 of the in-vehicle media monitoring device 104 is a microphone that may be implemented internal or external to the media monitoring device 104. The microphone receives ambient sound including audible media content presented in the vicinity of the media monitoring device 104. Alternatively, the audio receiver 202 may be implemented by a line input connection. The line input connection may allow a media presentation device such as a radio, CD player, MP3 player, DVD player, and/or television (not shown) to be communicatively coupled to the media monitoring device 104. The line input connector of the audio receiver may be implemented by, for example, a connector within the media monitoring device 104, a cable extended from the media monitoring device 104, a cradle associated with the media monitoring device 104, etc. Any other connection to receive information about media content presented within the vehicle may alternatively or additionally be used.

The audio presenter 203 of the illustrated example is implemented by a processor executing machine readable instructions, but it could alternatively be implemented by an application specific integrated circuit (ASIC), digital signal processor (DSP), field programmable gate array (FPGA), and/or other circuitry. In the illustrated example, when audio is received, the audio presenter 203 determines the source of the audio and, if applicable, presents the audio to the audio system of the vehicle. The audio presenter 203 of the illustrated example presents audio only when audio is received via a line input connector (e.g., from a panelist's MP3 player.) However, other configurations may also be acceptable (e.g., presenting audio only when received via a microphone, presenting audio regardless of the source, presenting audio only when a panelist enables the presentation.) Further, there may exist different presentation settings based on the determined audio source. For example, if audio is received via a Bluetooth connection (e.g., from a panelist's cellular phone, from a panelist's MP3 player, etc.), the audio presenter 203 may be configured to always present audio to the audio system of the vehicle.

In the illustrated example, audio is presented to the audio system of the vehicle by means of a radio frequency transmitter transmitting a frequency modulated (FM) signal. In such an implementation, the panelist tunes the audio system of the vehicle to the frequency that the audio presenter 203 transmits on. Any alternative method of audio presentation may additionally or alternatively be used such as, for example, an analog line-input, a digital interface, a Bluetooth communicator, etc.

The audience measurement data collector 204 of the illustrated example is implemented by a processor executing machine readable instructions, but it could alternatively be implemented by an application specific integrated circuit (ASIC), digital signal processor (DSP), field programmable gate array (FPGA), and/or other circuitry. In the illustrated example, the audience measurement data collector 204 determines content identifiers from audio received via the audio receiver 202. As used herein, a "content identifier" is any type of data and/or information associated with, inherent to, embedded with, inferable from and/or injected into a piece of content, and which may be used to identify that piece of content. Audience measurement codes (e.g., watermarks), public or private identifiers in bit streams (e.g., program identification (PID) headers), closed captioning information, signatures, metadata or any other type(s) of data can serve as content identifiers. A content identifier is generally not noticeable to the audience during playback, but this is not necessarily so. Signatures may be any unique or semi-unique aspect of content (e.g., luminance characteristics, audio spectrum characteristics, etc.) that may be used to identify the content based on comparison to reference signatures. A code may be any type of data that may be inserted in, embedded in, encoded in, or otherwise associated with content that may be extracted or determined from the content for comparison to reference codes. However, any data that may be useful in monitoring, identifying, crediting, or otherwise analyzing media content may be used.

The example audience measurement data storer 206 of FIG. 2 is implemented by a processor executing instructions, but it could alternatively be implemented by an ASIC, DSP, FPGA, or other circuitry. The data storer 206 receives audience measurement data from the audience measurement data collector 204 and stores the received audience measurement data in the data store 205. The data store 205 may also be capable of storing data which is not audience measurement data. For example, updated software and/or updated firmware may be stored in the data store 205. Further, updated software and/or updated firmware may be applied to the media monitoring device 104 to update the functionality of the media monitoring device 104. The data store 205 may be any device for storing data such as, for example, flash memory, magnetic media, etc. Furthermore, the data stored in the data store 205, may be in any data format such as, for example, binary data, comma delimited data, tab delimited data, structured query language (SQL) structures, etc.

The example wireless communicator 208 of FIG. 2 is implemented according to the Institute of Electrical and Electronics Engineers 802.15.4 communication protocol. However, any method of wired or wireless communication may alternatively be used (e.g., Bluetooth, Wi-Fi, Ethernet, Universal Serial Bus, Zigbee, etc.). The wireless communicator 208 may be configured to communicate with an external device via the antenna 210. Many different antenna configurations may be used. Example implementations may include the antenna 210 being an internal component of the media monitoring device 104, the antenna 210 being an external component of the media monitoring device 104, or the antenna 210 being integrated into the wireless communicator 208.

Figure 3:
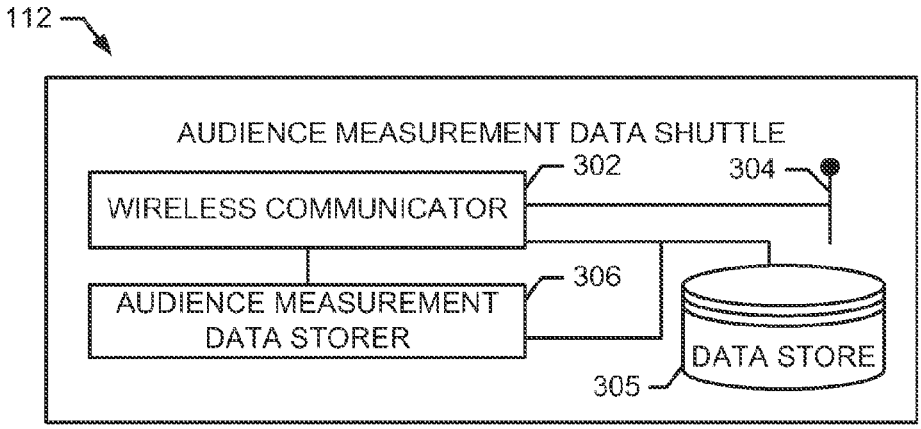
FIG. 3 is a block diagram of the example audience measurement data shuttle of FIG. 1.

FIG. 3 is a block diagram of the example audience measurement data shuttle 112 of FIG. 1. The example audience measurement data shuttle 112 includes a wireless communicator 302, an antenna 304, a data store 305, and an audience measurement storer 306. The example wireless communicator 302 is implemented according to the Institute of Electrical and Electronics Engineers 802.15.4 communication protocol. However, any method of wired or wireless communication may alternatively be used (e.g., Bluetooth, Wi-Fi, Ethernet, Universal Serial Bus, ZigBee, etc.). The wireless communicator 302 may be configured to communicate with an external device via the antenna 304. Many different antenna configurations may be used. Example implementations may include the antenna 304 being an internal component of the audience measurement data shuttle 112, the antenna 304 being an external component of the audience measurement data shuttle 112, or the antenna 304 being integrated into the wireless communicator 302.

The example audience measurement data storer 306 of FIG. 3 is implemented by a processor executing instructions but it could alternatively be implemented by an ASIC, DSP, FPGA, or other circuitry. The audience measurement data storer 306 receives audience measurement data from the wireless communicator 302 and stores the received-audience measurement data in the data store 305. The data store 305 may also be capable of storing data which is not audience measurement data. For example, updated software and/or updated firmware may be stored in the data store 305. Further, updated software and/or updated firmware may be applied to the audience measurement data shuttle 112 so as to update the functionality of the audience measurement data shuttle 112. The data store 305 may be any device for storing data such as, for example, flash memory, magnetic media, etc. Furthermore, the data stored in the data store 305, may be in any data format such as, for example, binary data, comma delimited data, tab delimited data, structured query language (SQL) structures, etc.

Figure 4:
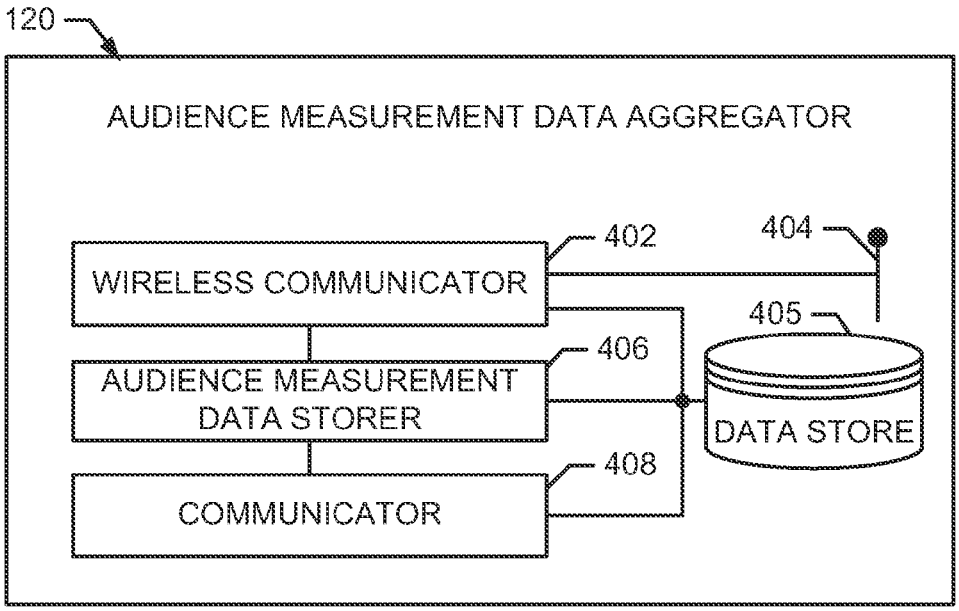
FIG. 4 is a block diagram of the example audience measurement data aggregator of FIG. 1.

FIG. 4 is a block diagram of the example audience measurement data aggregator 120 of FIG. 1. The example audience measurement data aggregator 120 includes a wireless communicator 402, an antenna 404, a data store 405, an audience measurement data storer 406, and a wired communicator 408. The example wireless communicator 402 is implemented according to the Institute of Electrical and Electronics Engineers 802.15.4 communication protocol. However, any method of wired or wireless communication may alternatively be used (e.g., Bluetooth, Wi-Fi, Ethernet, Universal Serial Bus, ZigBee, etc.). The wireless communicator 402 may be configured to communicate with an external device via the antenna 404. Many different antenna configurations may be used. Example implementations may include the antenna 404 being an internal component of the audience measurement data aggregator 120, the antenna 404 being an external component of the audience measurement data aggregator 120, or the antenna 404 being integrated into the wireless communicator 402.

The example audience measurement data storer 406 of FIG. 4 is implemented by a processor executing instructions but it could alternatively be implemented by an ASIC, DSP, FPGA, or other circuitry. The audience measurement data storer 406 receives audience measurement data from the wireless communicator 402 and stores the received audience measurement data in the data store 405. The data store 405 may also be capable of storing data which is not audience measurement data. For example, updated software and/or updated firmware may be stored in the data store 405. Further, updated software and/or updated firmware may be applied to the audience measurement data aggregator 120 so as to update the functionality of the audience measurement data aggregator 120. The data store 405 may be any device for storing data such as, for example, flash memory, magnetic media, etc. Furthermore, the data stored in the data store 405, may be in any data format such as, for example, binary data, comma delimited data, tab delimited data, structured query language (SQL) structures, etc.

The wired communicator 408 sends stored audience measurement data to the audience measurement data collection server 124 via the communication medium 126. The communication medium of the illustrated example is implemented by an Ethernet connection. However, any type of communication medium may be used such as, for example, a cellular module, a satellite module, a Digital Subscriber Line (DSL), etc. Advantageously, the communication medium is capable of communicating with the audience measurement data collection server 124 via the internet (e.g., an Internet Protocol connection). However, other communication methods and systems may be used such as, for example, a point to point connection, a private line, etc.

While an example manner of implementing the example audience measurement system 100 has been illustrated in FIGS. 1 through 4, one or more of the elements, processes and/or devices illustrated in FIGS. 1 through 4 may be combined, divided, re-arranged, omitted, eliminated and/or implemented in any other way. Further, the example media monitoring device 104, the audio receiver 202, the audio presenter 203, the audience measurement data collector 204, the data store 205, the audience measurement data storer 206, the wireless communicator 208, the audience measurement data shuttle 112, the wireless communicator 302, the data store 305, the audience measurement storer 306, the audience measurement data aggregator 120, the wireless communicator 402, the data store 405, the audience measurement data storer 406, the wired communicator 408, and/or more generally, the example audience measurement system 100 of FIGS. 1 through 4 may be implemented by hardware, software, firmware and/or any combination of hardware, software and/or firmware. Thus, for example, any of the example media monitoring device 104, the audio receiver 202, the audio presenter 203, the audience measurement data collector 204, the data store 205, the audience measurement data storer 206, the wireless communicator 208, the audience measurement data shuttle 112, the wireless communicator 302, the data store 305, the audience measurement storer 306, the audience measurement data aggregator 120, the wireless communicator 402, the data store 405, the audience measurement data storer 406, the wired communicator 408, and/or more generally, the example audience measurement system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example media monitoring device 104, the audio receiver 202, the audio presenter 203, the audience measurement data collector 204, the data store 205, the audience measurement data storer 206, the wireless communicator 208, the audience measurement data shuttle 112, the wireless communicator 302, the data store 305, the audience measurement storer 306, the audience measurement data aggregator 120, the wireless communicator 402, the data store 405, the audience measurement data storer 406, and/or the wired communicator 408 are hereby expressly defined to include a tangible medium such as a memory, DVD, CD, etc. storing the software and/or firmware. Further still, the example media monitoring device 104, the audio receiver 202, the audio presenter 203, the audience measurement data collector 204, the data store 205, the audience measurement data storer 206, the wireless communicator 208, the audience measurement data shuttle 112, the wireless communicator 302, the data store 305, the audience measurement storer 306, and/or the audience measurement data aggregator 120, the wireless communicator 402, the data store 405, the audience measurement data storer 406, and/or the wired communicator 408 of FIGS. 1 through 4 may include one or more elements, processes and/or devices in addition to, or instead of, those illustrated in FIGS. 1 through 4, and/or may include more than one of any or all of the illustrated elements, processes and devices.

FIGS. 5 through 11 are flowcharts representative of example machine readable instructions that may be executed to implement the system 100 and/or components of the system 100 including the media monitoring device 104 and the audience measurement data shuttle 112. In these examples, the machine readable instructions represented by each flowchart may comprise one or more programs for execution by: (a) a processor, such as the processor 1512 shown in the example computer 1500 discussed below in connection with FIG. 15, (b) a controller, and/or (c) any other suitable device. The one or more programs may be embodied in software stored on a non-transitory tangible medium such as, for example, a flash memory, a CD-ROM, a floppy disk, a hard drive, a DVD, or a memory associated with the processor 1512, but the entire program or programs and/or portions thereof could alternatively be executed by a device other than the processor 1512 and/or embodied in firmware or dedicated hardware (e.g., implemented by an application specific integrated circuit (ASIC), a programmable logic device (PLD), a field programmable logic device (FPLD), discreet logic, etc.). For example, any or all of the machine readable instructions represented by the flowcharts of FIGS. 5 through 11 could be implemented by any combination of software, hardware, and/or firmware. Also, some or all of the machine readable instructions represented by the flowchart of FIGS. 5 through 11 may be implemented manually. Further, although the example machine readable instructions are described with reference to the flowcharts illustrated in FIGS. 5 through 9, many other techniques for implementing the example methods and apparatus described herein may alternatively be used. For example, with reference to the flowcharts illustrated in FIGS. 5 through 11, the order of execution of the blocks may be changed, and/or some of the blocks described may be changed, eliminated, combined, and/or subdivided into multiple blocks.

Figure 5:
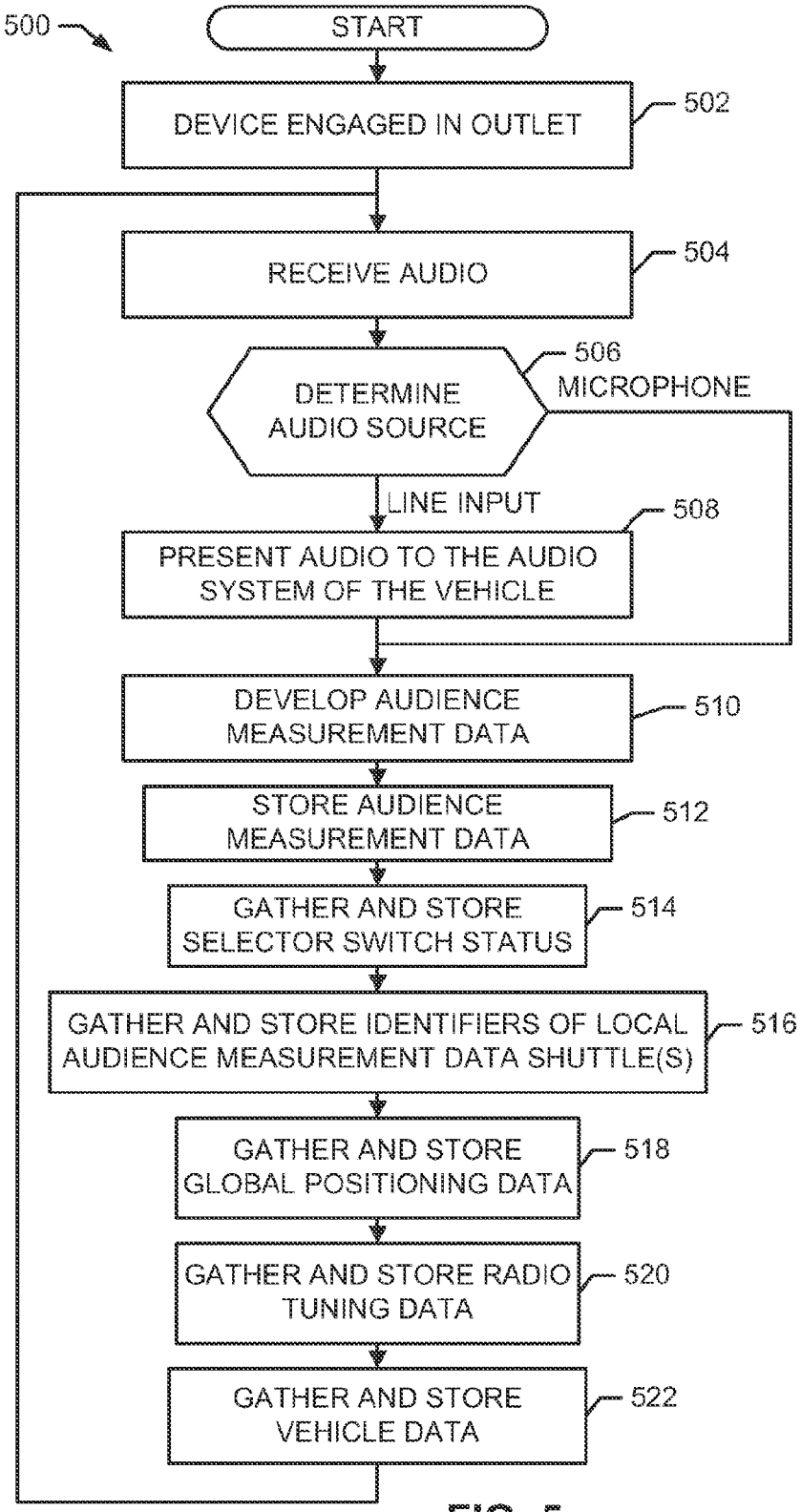
FIG. 5 is a flowchart representative of example machine readable instructions that may be executed to implement the example media monitoring device of FIGS. 1 and 2.

FIG. 5 is a flowchart representative of example machine readable instructions 500 which may be executed by the processor 1512 to implement the audience measurement data collection process of the media monitoring device 104.

The example process 500 begins when the media monitoring device 104 is engaged within a power outlet of the vehicle (block 502). In the illustrated example, engaging the media monitoring device 104 supplies power to the media monitoring device 104 and causes the media monitoring device 104 to be enabled. The media monitoring device 104 may have an alternate power supply such as, for example, a battery or a solar panel. Such alternate power supplies may enable the media monitoring device 104 to be active even when power is not supplied by the power outlet of the vehicle. Additionally or alternatively, the media monitoring device 104 may include a switch or other control that enables the panelist to selectively enable or disable the media monitoring device 104.

The media monitoring device 104 detects audio via the audio receiver 202 (block 504). The audio presenter 203 of the media monitoring device 104 then determines the source of the audio (block 506). If the audio presenter 203 determines that the audio is being received via a line input connector (e.g., the line input receptacle 1236), the audio presenter 203 presents the audio to the audio system of the vehicle (block 508). If the audio presenter 203 determines that the audio is being received via a microphone (e.g., the microphone 1228), control proceeds to block 510.

The audience measurement data collector 204 of the media monitoring device 104 processes the received audio to develop audience measurement data (block 510). The audience measurement data may be developed in any manner. In the illustrated example, audience measurement data is developed by detecting a code or watermark within the received audio. Alternatively or additionally, audience measurement data development may involve recording segments of the received audio, developing signatures from the audio, etc. The audience measurement data storer 208 then stores the audience measurement data in the data store 205 of the media monitoring device 104 (block 512).

In the illustrated example, additional data is added to the data store 205 by the audience measurement data storer 206. This additional data may be derived from any input. In the illustrated example, there exists a selector switch 1232 attached to the media monitoring device 104. The selector switch 1232 may be user actionable, allowing an audience member to identify the number of occupants of the vehicle by adjusting the position of the switch. The audience measurement data storer 206 of the media monitoring device 104 detects and stores the status of the selector switch 1232 in the data store 205 (block 514).

In addition to storing a setting of the selector switch, the audience measurement data storer 206 detects and stores identifiers of local audience measurement data shuttles (block 516). The gathered identifiers are stored in the data store 205. In the illustrated example, each member in a family of panelists (e.g., a father, a mother, a son, a daughter) is provided with a audience measurement data shuttle 112 and each shuttle has a unique identifier. By collecting the identifiers of local audience measurement data shuttles, media exposure can be more closely tied to individual panelists. For example, a panelist may tune to different media when alone in a vehicle, compared to when there are other panelists or persons present in the vehicle. To facilitate associating tuned audio with the actual panelist(s) located in a vehicle, the shuttle(s) 112 may broadcast their identifier(s) and the media monitoring device 104 may wirelessly collect such identifier(s) and store them with timestamps in the data store 205. In addition to storing an identifier of the audience measurement data shuttles, the audience measurement data storer 206 may additionally store an identifier associated with the media monitoring device 104. As explained in conjunction with FIGS. 6 and 7, there may be different audience measurement data transmission processes which may alleviate the need for block 516.

Further, in the example of FIG. 5, the audience measurement data storer 206 gathers local computer data from the computer system of the vehicle (blocks 518, 520, and 522). The local computer data may include many different types of data such as, for example, global positioning data, radio tuning data, vehicle data, audio system data, etc.

The audience measurement data storer 206 gathers and stores global positioning data (block 518). The global positioning data is stored in the data store 205. Global positioning data may be gathered via a Bluetooth connection to a Global Positioning System (GPS) receiver mounted within the vehicle. Alternatively, the GPS receiver may be integrated into the vehicle's computer system. In such a case, a communication link may be formed between the audience measurement data storer 206 and a computer system of the vehicle. The communication link may be implemented by an On Board Diagnostics (OBD-II) connector. Further, the media monitoring device 104 may also include an integrated GPS receiver. An integrated GPS receiver allows the audience measurement data storer 206 to collect global positioning data without being required to interface with an external device.

In addition to gathering global positioning data, the audience measurement data storer 206 gathers and stores radio tuning data (block 520). The radio tuning data is stored in the data store 205. Radio tuning data, when coupled with global positioning data, provides a method for audience measurement companies to more accurately determine the originator of the media. For instance, a media broadcaster may transmit media on a first frequency at one location, and on a second frequency at another location. A vehicle may move between different geographic regions such that the broadcaster to frequency relationship may be different. The GPS data thereby enables more accurate mapping of radio data to broadcasters. Radio tuning data may be gathered via a communication link between the audience measurement data storer 206 and the audio system of the vehicle. In the illustrated example, the communication link is implemented by a Bluetooth connection. However, many alternative types of communication links may alternatively be used such as, for example, and RS-232 connection, an Institute of Electrical and Electronics Engineers 802.15.4 connection, etc. Radio tuning data gathered by the audience measurement data storer 206 is stored in the data store 205.

Additionally, the audience measurement data storer 206 of the media monitoring device 104 of the example of FIG. 5 gathers vehicle data from a computer system of the vehicle (block 522). The vehicle data may include, for example, vehicle speed, vehicle make/model, door lock status, window status, vehicle temperature, external temperature, audience presence data (e.g., is a specific seat occupied as indicated by, for example, a pressure sensor used to turn an airbag off or on) etc. In the illustrated example, the audience measurement data storer 206 is communicatively coupled with the computer system of the vehicle via an OBD-II connector. The audience measurement data storer 206 collects the data via the OBD-II connector and then stores the vehicle data in the data store 205. After data has been stored, control returns to block 504.

Figure 6:
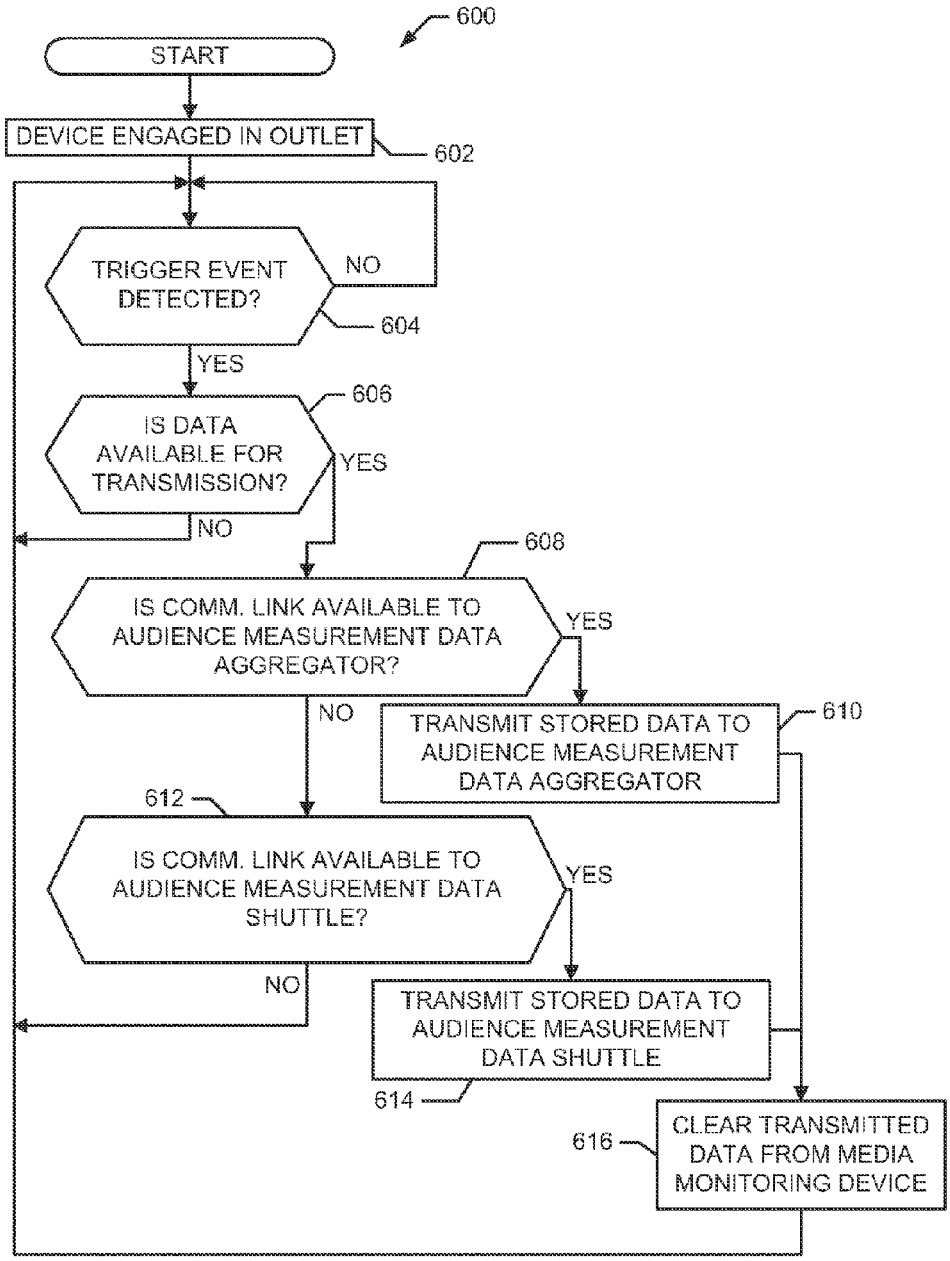
FIG. 6 is a flowchart representative of example machine readable instructions that may be executed to implement the audience measurement data transmission process of the example media monitoring device of FIGS. 1 and 2.

FIG. 6 is a flowchart representative of example machine readable instructions 600 to implement a first example audience measurement data transmission process of the media monitoring device 104. In the illustrated example, the instructions of process 600 are implemented in parallel with the instructions of process 500.

The example process 600 begins when the media monitoring device 104 is engaged within a power outlet of the vehicle (block 602). Block 602 is substantially the same as block 502, as the media monitoring device 104 is enabled by receiving power from the power outlet of the vehicle.

The wireless communicator 208 of the media monitoring device 104 waits for a trigger event (block 604). A trigger event may be'any sort of trigger event such as, for example, the expiration of a timer, the detection of an audio signal via the audio receiver 202 of the media monitoring device 104, the detection of stored audience measurement data reaching a threshold, the detection of an external audience measurement data receiving device (e.g. the audience measurement data shuttle 112, etc.) Once the trigger event has been detected, the wireless communicator 208 queries the data store 205 to determine the availability of audience measurement data for transmission (block 606). If audience measurement data is available for transmission, the media monitoring device determines the availability of an external audience measurement data receiving device (e.g., an audience measurement data shuttle 112, the audience measurement data aggregator 120). Since identifiers of audience measurement data shuttle(s) 112 are gathered in block 516, the audience measurement data stored in the data store 205 is already associated with the panelist(s) to which the media was presented. Therefore, the audience measurement data does not need to have audience measurement data shuttle identifiers added at a later point.

Returning to FIG. 6, the wireless communicator 208 determines if a communication link is available to the audience measurement data aggregator 120 (block 608). If a communication link between the wireless communicator 208 and the audience measurement data aggregator 120 is available, the stored audience measurement data is transmitted to the audience measurement data gateway 120 (block 610). After the wireless communicator 208 completes transmission of the stored audience measurement data to the audience measurement data aggregator 120, the wireless communicator 208 clears the transmitted audience measurement data from the data store 205 (block 616). Control then returns to block 604.

If the wireless communicator 208 determines that a communication link is not available to the audience measurement data aggregator 120, the wireless communicator 208 determines if a communication link is available to an audience measurement data shuttle 112 (block 612). If a communication link between the wireless communicator 208 and one or more audience measurement data shuttle(s) 112 is available, stored audience measurement data is transmitted to the audience measurement data shuttle 112 (block 614). After the wireless communicator 208 of the media monitoring device 104 has successfully transmitted the stored audience measurement data to the audience measurement data shuttle 112, the wireless communicator 208 clears the transmitted audience measurement data from the data store 205 (block 614). Control then returns to block 604. If no communication link between the wireless communicator 208 and an audience measurement data shuttle 112 is available (block 612), control returns to block 604.

Figure 7:
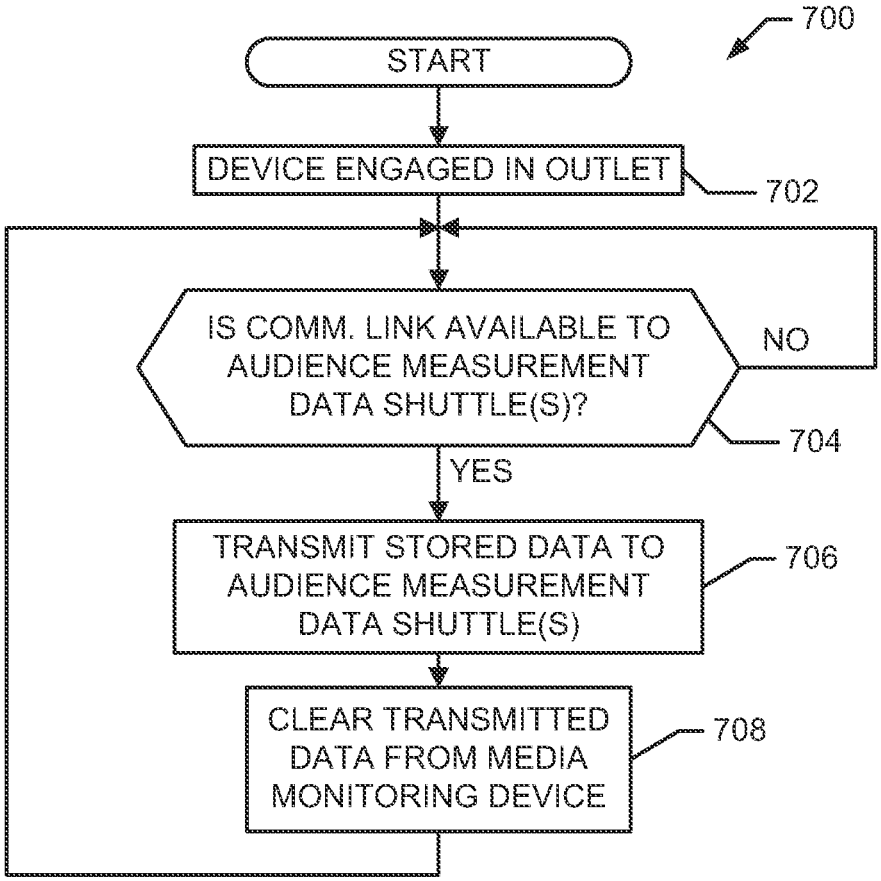
FIG. 7 is a flowchart representative of example machine readable instructions that may be executed to implement a second example audience measurement data transmission process of the example media monitoring device of FIGS. 1 and 2.

FIG. 7 is a flowchart representative of example machine readable instructions 700 to implement a second example audience measurement data transmission process of the media monitoring device 104. In the illustrated example, the instructions of process 700 are implemented in parallel with the instructions of process 500. Additionally, the illustrated process 700 may be implemented as an alternative to process 600.

The example process 700 begins when the media monitoring device 104 is engaged within a power outlet of the vehicle (block 702). Block 702 is substantially the same as blocks 502 and 602, as the media monitoring device 104 is enabled by receiving power from the power outlet of the vehicle.

After the media monitoring device 104 is powered on, the wireless communicator 208 of the media monitoring device 104 begins searching for available communication links to audience measurement data shuttle(s) 112 (block 704). If no communication link is available (block 704), the wireless communicator 208 continues to search for available communication links (block 704). If a communication link is available, the wireless communicator 208 transmits stored audience measurement data to the available audience measurement data shuttle(s) 112 (block 706). In the illustrated example, audience measurement data is transmitted to all local audience measurement data shuttles. Therefore, each audience measurement data shuttle 112 receives audience measurement data only when in the presence of the media monitoring device 104. In the illustrated example, block 516 may not be implemented (i.e., the media monitoring device 104 may not collect and store shuttle identifiers), therefore an identifier of the audience measurement data shuttle should be added by each of the audience measurement data shuttle(s) 112 that receive the data, or by the audience measurement data aggregator 120 when it receives the data from the audience measurement data shuttles 112. After the wireless communicator 208 has transmitted the audience measurement data, it clears the transmitted data from the data store 205 (block 708.) Control then returns to block 704.

Figure 8:
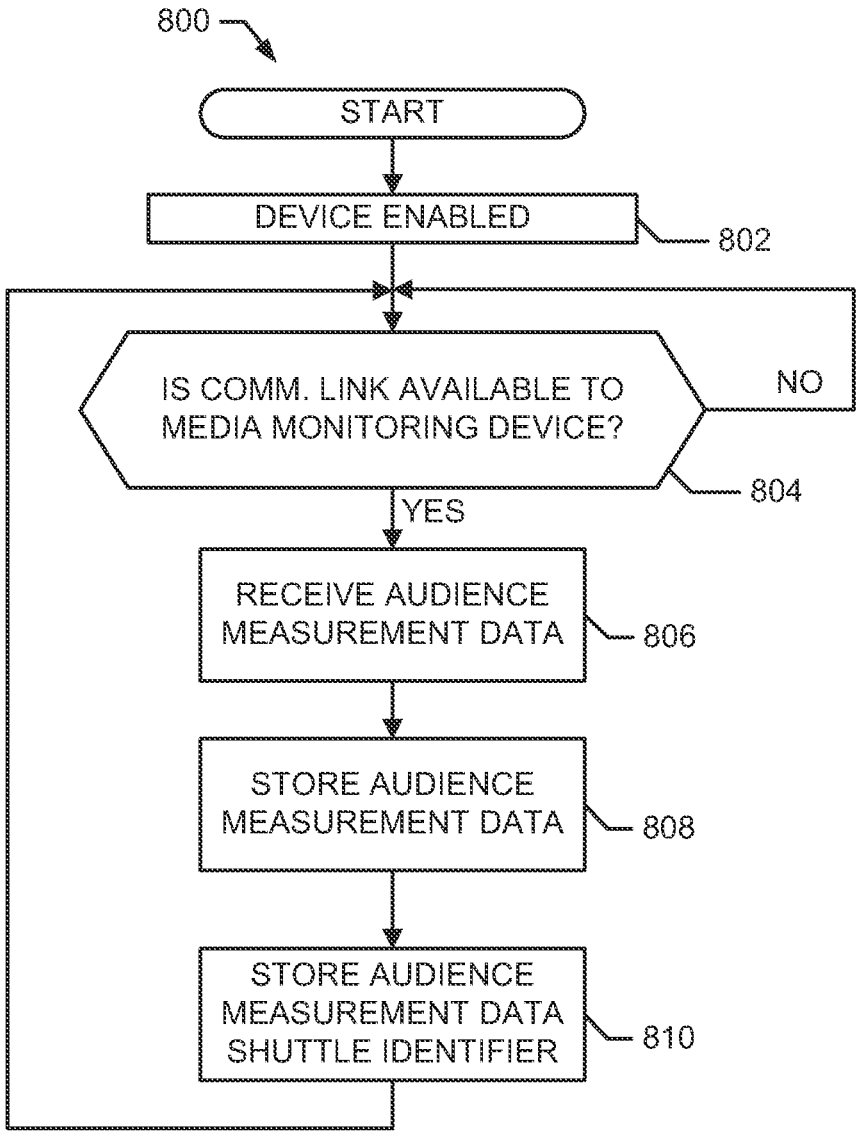
FIG. 8 is a flowchart representative of example machine readable instructions that may be executed to implement the audience measurement data reception process of the example audience measurement data shuttle of FIGS. 1 and 3.
Figure 9:
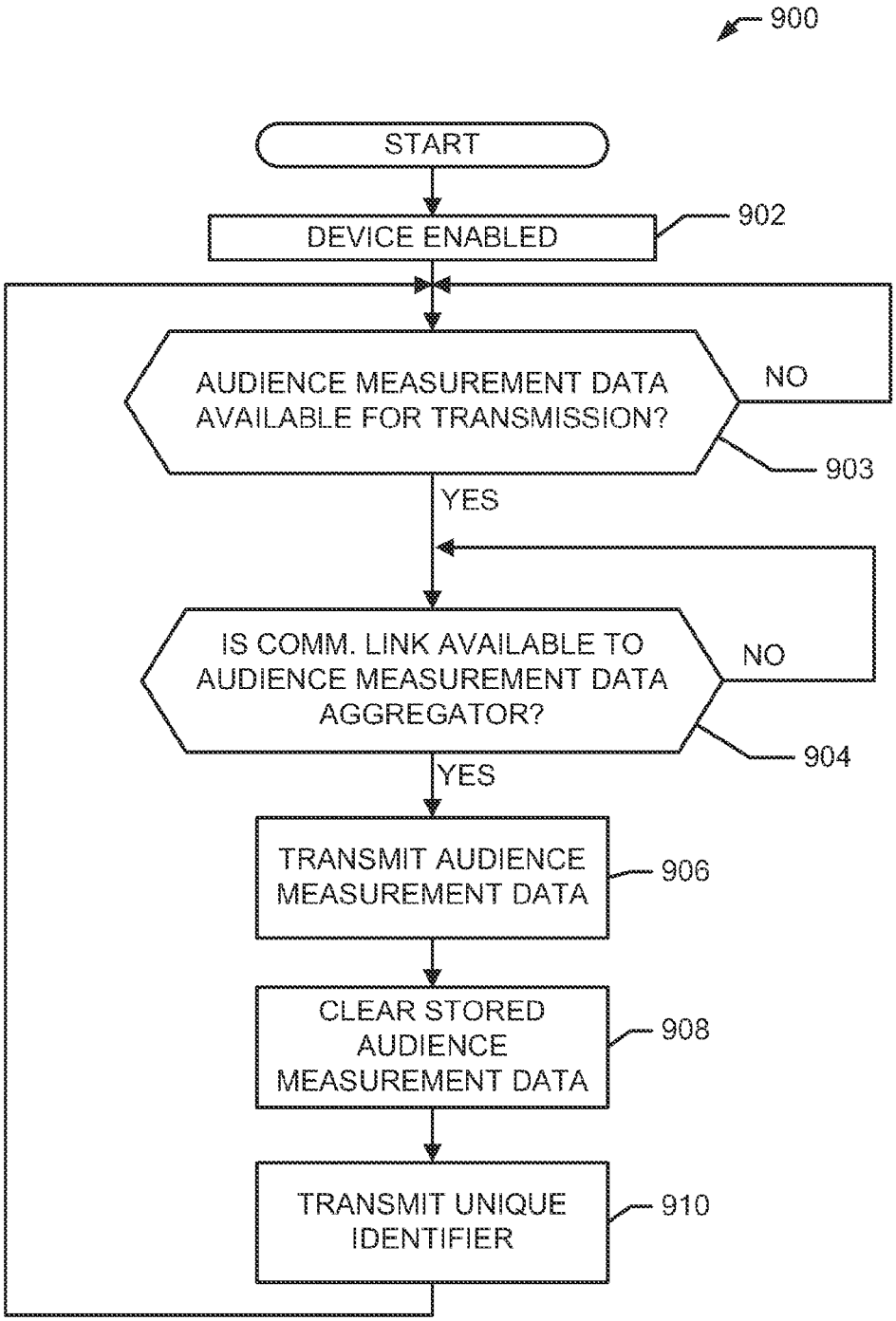
FIG. 9 is a flowchart representative of example machine readable instructions that may be executed to implement the audience measurement data transmission process of the example audience measurement data shuttle of FIGS. 1 and 3.

FIGS. 8 and 9 are flowcharts representative of example machine readable instructions 800 and 900 which may be executed to implement the audience measurement data shuttle 112. In the illustrated example, the instructions of process 800 are implemented in parallel with the instructions of process 900.

The example process 800 begins when the audience measurement data shuttle 112 is enabled (block 802). In the illustrated example, the audience measurement data shuttle 112 is enabled when it is constructed (e.g., a battery is inserted, thereby powering the shuttle). Many other means of enabling the audience measurement data shuttle 112 may be used such as, for example, a solar panel, an inductive power transmission, etc. Additionally or alternatively, the audience measurement data shuttle 112 may include a switch or other control that permits the panelist to selectively enable the audience measurement data shuttle 112. This method, however, is not preferred, as it requires additional panelist interaction.

After being enabled, the wireless communicator 302 of the audience measurement data shuttle 112 determines if a communication link 108 is available to a media monitoring device 104 (block 804). If a communication link 108 is available, control proceeds to block 806. If no communication link 108 is available, control returns to block 804 where the wireless communicator 302 waits for a communication link 108 to become available. When a communication link is available (block 804), the wireless communicator 302 receives audience measurement data from the media monitoring device 104 (block 806). Received audience measurement data is then stored by the audience measurement data storer 306 of the audience measurement data shuttle 112 (block 808). The received audience measurement data is stored in the data store 305 of the audience measurement data shuttle 112. After the audience measurement data has been received and stored, the audience measurement data storer 306 inserts a unique identifier of the audience measurement data shuttle 112 into the data store 305 (block 810). The unique identifier may be added to unique identifiers already present in the audience measurement data. For example, the audience measurement data storer 206 of the media monitoring device 104 may have inserted unique identifiers for local audience measurement data shuttles 112 (block 516). The audience measurement data storer 306 adds the unique identifier to the audience measurement data stored in the data store 305 regardless of whether unique identifiers are present. Additionally or alternatively, the audience measurement data storer 306 may determine if unique identifiers are present and add a unique identifier of the audience measurement data shuttle 112 if necessary. After data has been stored, control then returns to block 804 to await another communication of audience measurement data from the media monitoring device 104.

The example process 900 of FIG. 9 begins when the audience measurement data shuttle 112 is enabled (block 902). Block 902 is substantially the same as block 802, as the audience measurement data shuttle 112 is enabled in both blocks. After being enabled, the wireless communicator 302 of the audience measurement data shuttle 112 determines if audience measurement data is present in the data store 305 (block 903). If audience measurement data is not present, control returns to block 903, wherein the wireless communicator 302 waits for audience measurement data to be populated in the data store 305. If audience measurement data is present in the data store 305, control proceeds to block 904.

Once the wireless communicator 302 has determined that audience measurement data is present in the data store 305, the wireless communicator 302 proceeds to determine if a communication link 114 is available to an audience measurement data aggregator 120 (block 904). If a communication link 114 is available, control proceeds to block 906. If no communication link 114 is available, control returns to block 904 where the wireless communicator 302 waits for the communication link 114 to become available. The wireless communicator 302 then transmits audience measurement data from the data store 305 to the audience measurement data aggregator (block 906). After successfully transmitting audience measurement data via the wireless communicator 302, the audience measurement data storer 306 clears stored audience measurement data from the data store 305 (block 908). In the illustrated example, the wireless communicator 302 then transmits the unique identifier of the audience measurement data shuttle 112 to the audience measurement data aggregator 120. This provides an additional means of linking specific panelists to media data. For example, if neither block 516 nor block 810 were implemented, by implementing block 910 the audience measurement data aggregator 120 is able to link the panelist to audience measurement data from a specific audience measurement data shuttle 112. If block 516 and/or block 810 is implemented, block 910 may be omitted. Control then returns to block 903 to await additional audience measurement data.

Figure 10:
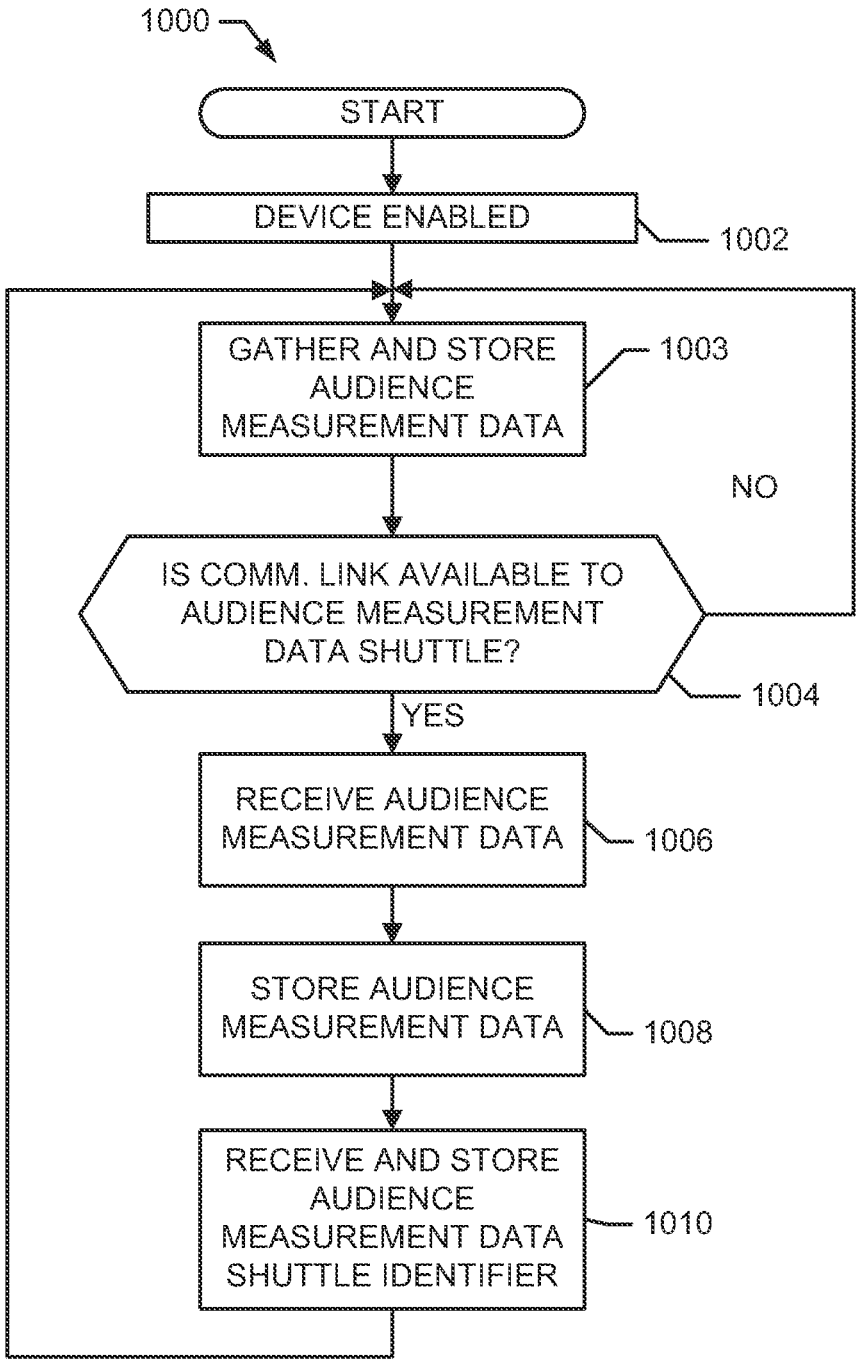
FIG. 10 is a flowchart representative of example machine readable instructions that may be executed to implement the audience measurement data reception process of the example audience measurement data aggregator of FIGS. 1 and 4.
Figure 11:
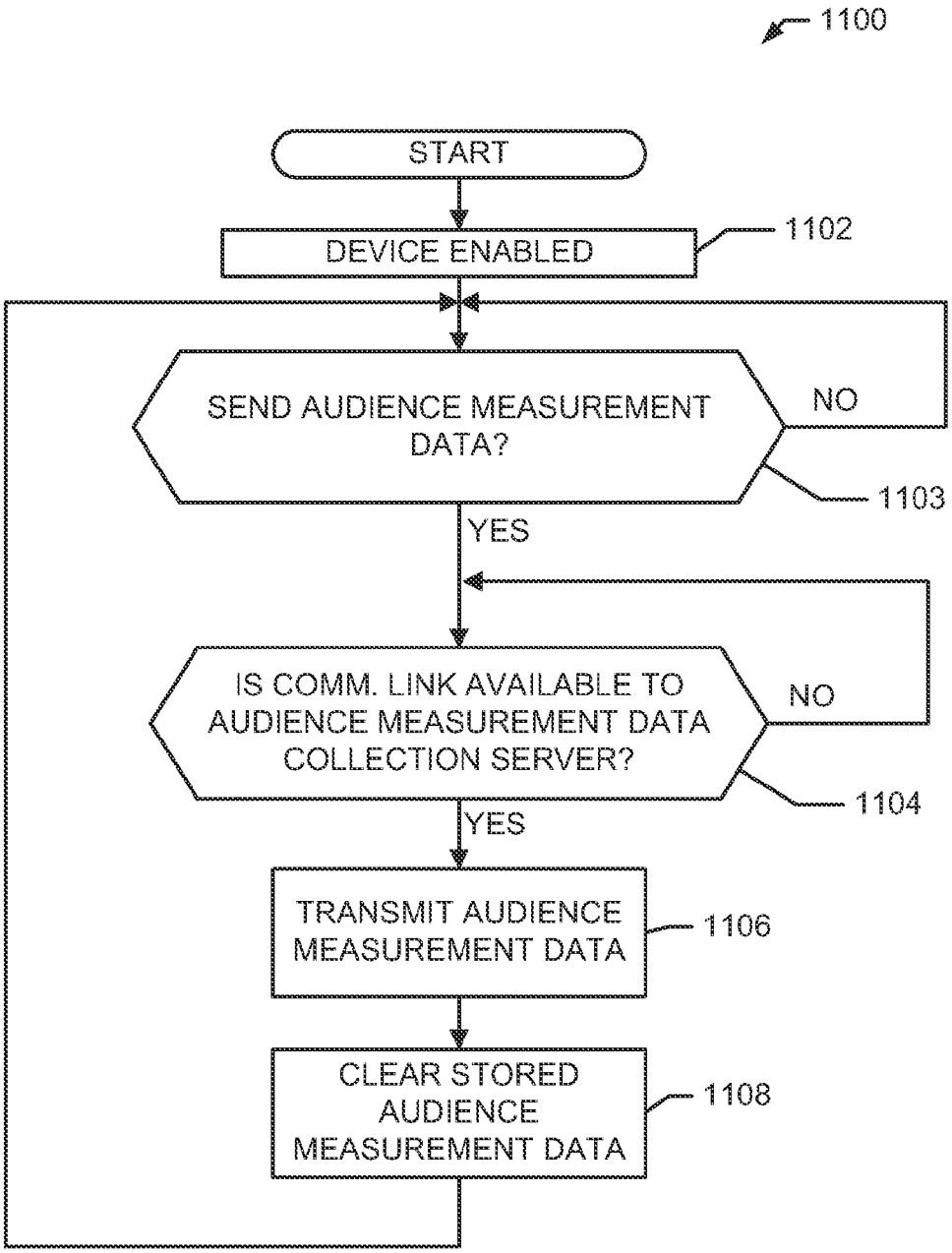
FIG. 11 is a flowchart representative of example machine readable instructions that may be executed to implement the audience measurement data transmission process of the example audience measurement data aggregator of FIGS. 1 and 4.

FIGS. 10 and 11 are flowcharts representative of example machine readable instructions 1000 and 1100 which may be executed to implement the audience measurement data aggregator 120. In the illustrated example, the instructions of process 1000 are implemented in parallel with the instructions of process 1100.

The example process 1000 begins when the audience measurement data aggregator 120 is enabled (block 1002). In the illustrated example, the audience measurement data aggregator 120 is enabled when it is powered (e.g., plugged into a power outlet). Many other means of enabling the audience measurement data aggregator 120 may be used. For example, a battery may be used to power the audience measurement data aggregator. Additionally or alternatively, the audience measurement data aggregator 120 may include a switch or other control that enables the panelist to enable the audience measurement data aggregator 120.

After being enabled, the audience measurement data storer 406 gathers and stores local audience measurement data (block 1003). This local audience measurement data may be from any source other than the audience measurement data shuttle 112. In the illustrated example, the audience measurement data storer 406 gathers and stores audience measurement from a local meter that collects codes and/or signatures from free field audio to measure media exposure in the household. The audience measurement data storer 406 may also collect data from a people meter that identifies members of the audience. The local meter may monitor any sort of information presenting devices such as a set top box, a television set, a personal computer, a radio, etc. The audience measurement data gathered by the audience measurement data storer 406 is stored in the data store 405. In the illustrated example, audience measurement data is gathered serially, however other methods of audience measurement data aggregation may be used. For example, audience measurement data aggregation from multiple audience measurement devices may be performed in parallel.

The wireless communicator 402 of the audience measurement data aggregator 120 determines if a communication link 114 is available to the audience measurement data shuttle 112 (block 1004). If a communication link 114 is not available, control returns to block 1004 where the audience measurement data storer 406 gathers and stores local audience measurement data. If a communication link 114 is available, the wireless communicator receives audience measurement data from the audience measurement data shuttle 112 (block 1006). The audience measurement data storer 406 then stores the received audience measurement data in the data store 405 (block 1008). In the illustrated example, the wireless communicator 402 of the audience measurement data aggregator 120 also receives and stores the unique identifier of the audience measurement data shuttle 112 to log the source of the data (block 1010). After receiving and storing audience measurement data from the audience measurement data shuttle 112, control returns to block 1003 where data from a second audience measurement data shuttle 112 may be received.

The example process 1100 begins when the audience measurement data aggregator 120 is enabled (block 1102). Block 1102 is substantially the same as block 1002, as the audience measurement data aggregator 120 is enabled in both blocks.

After being enabled, the communicator 408 determines whether audience measurement data should be sent (block 1103). In the illustrated example, audience measurement data is sent on a regular interval (e.g., every day, every hour, etc.). Additionally or alternatively, audience measurement data may be sent a-periodically in response to non-time based triggers, such as, for example, a threshold of audience measurement data being reached in the data store 405, a request received from an external source, etc. Irrespective of the triggering mechanism, once the communicator 408 has determined that audience measurement data should be transmitted, the communicator 408 determines if a communication link 126 is available to the audience measurement data collection server 124. If a communication link 126 is not available, control returns to block 1104 where the communicator 408 waits for a communication link 126 to become available. If the communication link 126 is available, control proceeds to block 1106. The communicator 408 transmits audience measurement data that was stored in the data store 405 to the audience measurement data collection server 124 via the communication link 126 (block 1106). After the audience measurement data has been successfully transmitted, the wireless communicator 408 clears the stored audience measurement data from the data store 405 (block 1108). Control then returns to block 1103.

Figure 12:
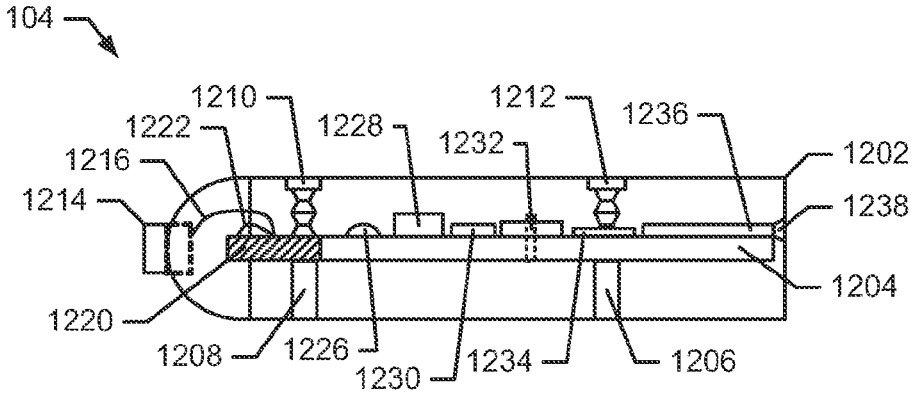
FIG. 12 is a side, cross-sectional view of the example media monitoring device of FIGS. 1 and 2.
Figure 13:
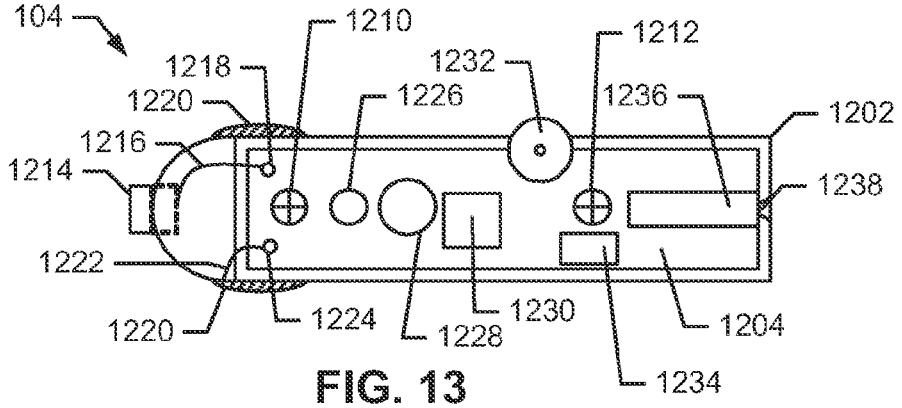
FIG. 13 is a top, cross-sectional view of the example media monitoring device of FIG. 12.
Figure 14:
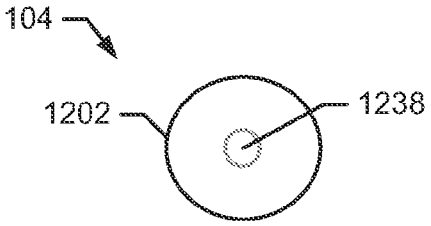
FIG. 14 is a rear, cross-sectional view of the example media monitoring device of FIGS. 12 and 13.

FIGS. 12, 13, and 14 are views of the example in-vehicle media monitoring device 104 of FIGS. 1 and 2. The example media monitoring device 104 comprises a housing 1202. The example housing 1202 is made of plastic. However, any other material may alternatively be used to create the housing 1202. Internal to the housing 1202 is a Printed Circuit Board (PCB) 1204, to which additional components are affixed. To support the PCB 1204 within the housing 1202, a set of standoffs 1206, 1208, 1210, and 1212 may be used. The standoffs 1206, 1208, 1210, and 1212 may be of any form factor and may be made of any material. Additionally or alternatively, the standoffs 1206, 1208, 1210, and 1212 may be integral to the construction of the housing 1202.

The example housing 1202 is dimensioned to engage within a 12 volt power outlet of the vehicle. In order to draw power from the 12 volt power outlet of the vehicle, a positive power connector 1214 connects to a 12 volt connector of the 12 volt power outlet, while a ground power connector 1220 connects to a ground connector of the 12 volt power outlet. A wire 1216 is used to connect the positive power connector 1214 to the PCB 1204, via a connection point 1218 (see FIG. 13). Likewise, a wire 1222 connects the ground power connector 1220 to the PCB 1204, via a connection point 1224. Additionally or alternatively, a fuse may be inserted between the positive power connector 1214 and the positive connection point 1218 of the PCB 1204 along the wire 1216.

The PCB 1204 supports different components to provide the functionality of the in-vehicle media monitoring device 104. In the illustrated example, such components include a power indicator 1226, a microphone 1228, a processor 1230, a selector switch 1232, a wireless communicator 1234, and a line-input receptacle 1236.

The power indicator 1226 may be any type of power indication component. In the illustrated example, the power indicator 1226 is a light emitting diode. Alternative forms of display may be used. For example, a display screen may be used to convey additional information about the operation of the media monitoring device 104.

The microphone 1228 receives audio for use by the media monitoring device 104. The microphone 1228 may be any type of microphone (e.g., passive, active). Additionally, the housing 1202 may be created with openings near the microphone 1228 to allow sound to enter the housing 1202 and reach the microphone 1228.

The processor 1230 may be configured to interface with the other components of the media monitoring device 104. In the illustrated example, the processor 1230 is a microcontroller. However, any type of processing device may be used (e.g., a digital signal processor (DSP), an application-specific integrated circuit (ASIC), a field-programmable gate array (FPGA), or a microcontroller) to implement the processor 1230. The processor 1230 may additionally include a memory for storing audience measurement data.

The selector switch 1232 is used to provide additional input parameters to the media monitoring device 104. The physical selector switch may be implemented by any switch design (e.g., button, knob, slider, touch screen, etc.). In the illustrated example, a rotator is used to allow an audience member to select the number of occupants of the vehicle. The housing 1202 may be configured to allow exposure of the rotator switch 1232, so that the audience member can physically adjust the setting. Any physical or virtual switche(s) of any style or type may alternatively or additionally be used to input selections to the media monitoring device 104. For instance, an audio recognition system might be used to allow an audience member to provide an input to the media monitoring device 104 without having to physically manipulate the device.

The wireless communicator 1234 interfaces wirelessly with external audience measurement data receiving devices (e.g., the audience measurement data shuttle 112, the audience measurement data aggregator 120). In the illustrated example, the wireless communicator 1234 is an Institute of Electrical and Electronics Engineers 802.15.4 wireless module. However, any type of wireless communication device may alternatively be used (e.g., Bluetooth, Wi-Fi, etc.). Furthermore, the wireless antenna 210 may be integral to the design of the wireless communicator component 1234, the wireless antenna 210 may be integral to the PCB 1204, the wireless antenna 210 may be external to the PCB 1204, or the wireless antenna 210 may be in some other configuration.

The line input receptacle 1236 may be provided in addition to or as an alternative to the microphone 1228 to input audio to the media monitoring device 104. The line-input receptacle 1236 may be of any configuration that would allow an external connector to be affixed. In the illustrated example, a 3.5 mm receptacle is used to allow for an external audio device to be connected to the media monitoring device 104. However, any type or style of receptacle could alternatively be used. For example, a 2.5 mm receptacle could be used to reduce the physical size of the receptacle. Alternatively, the line-input receptacle 1236 may be a cable extending from the media monitoring device 104 which would allow for a direct connection to an external audio device. Furthermore, the housing 1202 may include an opening 1238 which would allow for external input cables to be affixed to the line-input receptacle 1236.

FIG. 13 is a top, cross-sectional view of the example media monitoring device of FIG. 12.

FIG. 14 is a rear, cross-sectional view of the example media monitoring device of FIGS. 12 and 13.

Figure 15:
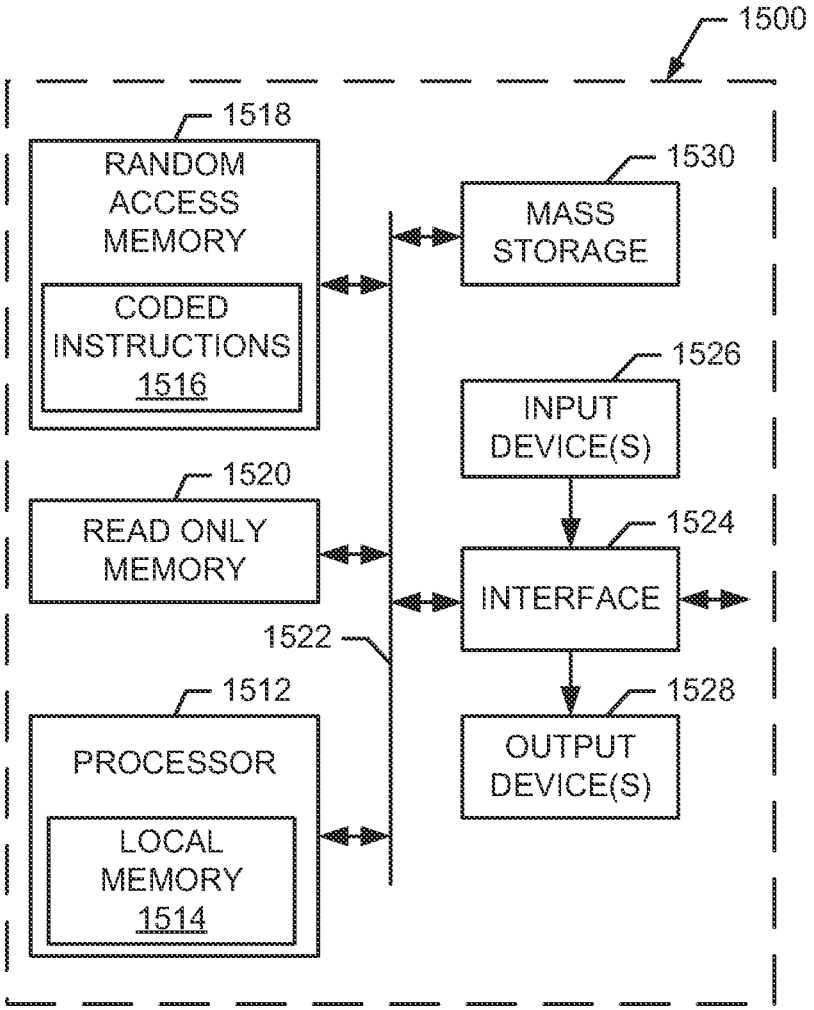
FIG. 15 is a block diagram of an example processor system that may execute, for example, the machine readable instructions of FIGS. 5 through 11 to implement the example media monitoring device of FIGS. 1, 2, and 12 through 14; the example audience measurement data shuttle of FIGS. 1 and 3; and/or the example audience measurement data aggregator of FIGS. 1 and 4.

FIG. 15 is a block diagram of an example processor platform 1500 capable of implementing the apparatus and methods disclosed herein. The processor platform 1500 can be, for example, a server, a personal computer, a personal digital assistant (PDA), an Internet appliance, a DVD player, a CD player, a digital video recorder, a personal video recorder, a set top box, a dedicated device, or any other type of computing device.

The system 1500 of the instant example includes a processor 1512 such as a general purpose programmable processor. The processor 1512 includes a local memory 1514, and executes coded instructions 1516 present in the local memory 1514 and/or in another memory device. The processor 1512 may execute, among other things, the machine readable instructions represented in FIGS. 5-9. The processor 1512 may be any type of processing unit, such as one or more microprocessors from the Intel® Centrino® family of microprocessors, the Intel®Pentium family of microprocessors, the Intel® Itanium® family of microprocessors, and/or the Intel XScale® family of processors. Of course, other processors from other families are also appropriate.

The processor 1512 is in communication with a main memory including a volatile memory 1518 and a non-volatile memory 1520 via a bus 1522. The volatile memory 1518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1520 may be implemented by flash memory and/or any other desired type of memory device. Access to the main memory 1518, 1520 is typically controlled by a memory controller (not shown).

The processor platform 1500 also includes an interface circuit 1524. The interface circuit 1524 may be implemented by any type of interface standard, such as an Ethernet interface, a universal serial bus (USB), and/or a third generation input/output (3GIO) interface.

One or more input devices 1526 are connected to the interface circuit 1524. The input device(s) 1526 permit a user to enter data and commands into the processor 1512. The input device(s) can be implemented by, for example, a keyboard, a mouse, a touchscreen, a track-pad, a trackball, an isopoint and/or a voice recognition system.

One or more output devices 1528 are also connected to the interface circuit 1524. The output devices 1528 can be implemented, for example, by display devices (e.g., a liquid crystal display, a cathode ray tube display (CRT)), by a printer and/or by speakers. The interface circuit 1524, thus, typically includes a graphics driver card.

The interface circuit 1524 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processor platform 1500 also includes one or more mass storage devices 1530 for storing software and data. Examples of such mass storage devices 1530 include floppy disk drives, hard drive disks, compact disk drives and digital versatile disk (DVD) drives. The mass storage device 1530 may implement the example data stores 205, 305, and 405. Alternatively, the volatile memory 1518 may implement the example data stores 205, 305, and 405.

As an alternative to implementing the methods and/or apparatus described herein in a system such as the device of FIG. 15, the methods and or apparatus described herein may be embedded in a structure such as a processor and/or an ASIC (application specific integrated circuit). As discussed above, small form factor processors and devices are preferred for the in-vehicle media monitoring device 104 and the audience measurement data shuttle 112.

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A method of monitoring media exposure in an automobile, the method comprising:

collecting audience measurement data with a media monitoring device fixed in an automobile, the audience measurement data based on audio received within the automobile by the media monitoring device;

storing the audience measurement data in a memory of the media monitoring device;

detecting the presence of a shuttle located within the automobile, the shuttle being incapable of collecting audience measurement data independent of the media monitoring device;

transmitting the audience measurement data from the media monitoring device to the shuttle;

moving the shuttle from the automobile and into proximity of an audience measurement data aggregator;

transmitting the audience measurement data from the shuttle to the audience measurement data aggregator; and transmitting the audience measurement data from the audience measurement data aggregator to an audience measurement data collection server.

2. The method as described in claim 1, [wherein the media monitoring device collects] *further including collecting* audio via at least one of a microphone or a line input connection *of the media monitoring device*.

3. The method as described in claim 2, [wherein the media monitoring device provides] *further including providing* audio to an audio system of the automobile *with the media monitoring device*.

4. The method as described in claim 1, wherein the media monitoring device is communicatively coupled with a computer system of the automobile.

5. The method as described in claim 4, wherein the audience measurement data includes local computer data from the computer system of the automobile.

6. The method as described in claim 1, wherein the shuttle includes a wireless transmitter and a memory.

7. The method as described in claim 1, further [comprising] *including* deleting the audience measurement data from the memory of the media monitoring device after the audience measurement data is transmitted to the shuttle.

8. The method as described in claim 1, further [comprising] *including* determining if a communication link is available to the shuttle.

9. A system to monitor media exposure in an automobile, the system comprising:

a media monitoring device fixed in an automobile [to], *the media monitoring device including*:

*an audience measurement data collector to* collect audience measurement data based on audio presented within the automobile;

*an audience measurement data storer to* store the audience measurement data in a memory of the media monitoring device;

*a wireless communicator structured to detect the presence of a shuttle located within the automobile, the shuttle being incapable of collecting audience measurement data independent of the media monitoring device;*

*when the shuttle is detected, the wireless communicator structured to* transmit the audience measurement data *from the media monitoring device to the shuttle*;

[an audience measurement data shuttle to receive the audience measurement data, the shuttle being incapable of collecting audience measurement data independent of the media monitoring device;] and an audience measurement data aggregator to receive the audience measurement data when transmitted by the shuttle, to store the audience measurement data in a tangible memory, and to transmit the audience measurement data to a media monitoring collection server.

10. The system as described in claim 9, wherein the media monitoring device is to receive power from a power system of the automobile.

11. The system as described in claim 9, wherein the media monitoring device is to receive the audio via at least one of a microphone or a line input connector.

12. The system as described in claim 11, wherein the media monitoring device is to transmit audio to an audio system of the automobile.

13. The system as described in claim 9, wherein the media monitoring device is to add first data to the audience measurement data, the first data being derived from a computer system of the automobile.

14. The system as described in claim 9, wherein the shuttle is a key fob.

[15. The system as described in claim 9, wherein the transmission between the media monitor and the shuttle is implemented according to the Institute of Electrical and Electronics Engineers 802.15.4 standard.]

[16. The system as described in claim 9, wherein the transmission between the shuttle and the aggregator is implemented according to the Institute of Electrical and Electronics Engineers 802.15.4 standard.]

17. The system as described in claim 9, wherein the aggregator is to receive the audience measurement data from multiple shuttles.

18. The system as described in claim 9, wherein the media monitoring device is communicatively coupled with a computer system of the automobile via an On Board Diagnostics (OBD-II) connector.

19. The system as described in claim 9, wherein the media monitoring device [adds] *is to add* first data to the audience measurement data, the first data being derived from a physical selector switch located on the media monitoring device.

*20. A tangible machine-readable storage medium comprising instructions which, when executed, cause a media monitoring device fixed in an automobile to at least:*

*collect audience measurement data based on audio detected within the automobile;*

*store the audience measurement data in a memory;*

*detect the presence of a shuttle located within the automobile, the shuttle being incapable of collecting audience measurement data independent of the media monitoring device; and*

*in response to detecting the presence of the shuttle, transmit the audience measurement data from the media monitoring device to the shuttle, the shuttle to transmit the audience measurement data from the shuttle to an audience measurement data aggregator when the shuttle is moved from the automobile and into proximity of the audience measurement data aggregator, the audience measurement data aggregator to transmit the audience measurement data to an audience measurement data collection server.*

*21. The machine-readable storage medium as described in claim 20, wherein the instructions, when executed, cause the media monitoring device to collect the audience measurement data based on audio received via at least one of a microphone or a line input connection.*

*22. The machine-readable storage medium as described in claim 21, wherein the instructions, when executed, cause the media monitoring device to provide audio to an audio system of the automobile.*

*23. The machine-readable storage medium as described in claim 20, wherein the audience measurement data includes local computer data from a computer system of the automobile.*

*24. The machine-readable storage medium as described in claim 20, wherein the shuttle includes a wireless transmitter and a memory.*

*25. The machine-readable storage medium as described in claim 20, wherein the instructions, when executed, cause the media monitoring device to delete the audience measurement data from the memory after the audience measurement data is transmitted to the shuttle.*

*26. The machine-readable storage medium as described in claim 20, wherein the instructions, when executed, cause the media monitoring device to determine if a communication link is available to the shuttle.*

*27. The machine-readable storage medium as described in claim 22, wherein the instructions, when executed, cause the media monitoring device to provide audio to an audio system of the automobile via at least one of a radio frequency transmission or a line input connector.*

*28. The machine-readable storage medium as described in claim 23, wherein the local computer data includes at least one of: global positioning data, radio tuning data, or vehicle data.*

* * * * *